(12) United States Patent
Han et al.

(10) Patent No.: US 9,179,456 B2
(45) Date of Patent: Nov. 3, 2015

(54) METHODS AND APPARATUS FOR DOWNLINK CONTROL CHANNELS TRANSMISSIONS IN WIRELESS COMMUNICATIONS SYSTEMS

(71) Applicant: Samsung Electronics Co., Ltd., Suwon-si, Gyeonggi-do (KR)

(72) Inventors: Jin-Kyu Han, Allen, TX (US); Jianzhong Zhang, Plano, TX (US); Younsun Kim, Seongnam-shi (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 205 days.

(21) Appl. No.: 13/759,807

(22) Filed: Feb. 5, 2013

(65) Prior Publication Data

US 2013/0215842 A1  Aug. 22, 2013

Related U.S. Application Data

(60) Provisional application No. 61/596,079, filed on Feb. 7, 2012, provisional application No. 61/613,839, filed on Mar. 21, 2012.

(51) Int. Cl.
*H04W 4/00* (2009.01)
*H04W 72/04* (2009.01)
(Continued)

(52) U.S. Cl.
CPC ........... *H04W 72/042* (2013.01); *H04B 7/0452* (2013.01); *H04L 5/0053* (2013.01); *H04L 5/0023* (2013.01)

(58) Field of Classification Search
CPC . H04W 43/0852; H04W 72/04; H04W 76/00; H04W 72/0446; H04W 88/08; H04L 5/14
USPC ......... 370/252, 280, 241, 329, 328, 330, 311, 370/336
See application file for complete search history.

(56) References Cited

U.S. PATENT DOCUMENTS 8,559,354 B2 * 10/2013 Kwon et al. ............ 370/312
2013/0044693 A1 * 2/2013 Lindh et al. ............ 370/329

FOREIGN PATENT DOCUMENTS

| WO | WO 2010/053984 A2 | 5/2010 |
| WO | WO 2010/076300 A1 | 7/2010 |
| WO | WO 2011/037439 A2 | 3/2011 |

(Continued)

OTHER PUBLICATIONS

International Search Report dated May 29, 2013 in connection with International Patent Application No. PCT/KR2013/001001, 3 pages.
Written Opinion of International Searching Authority dated May 29, 2013 in connection with International Patent Application No. PCT/KR2013/001001, 4 pages.

(Continued)

*Primary Examiner* — Chi H Pham
*Assistant Examiner* — Alexander O Boakye

(57) ABSTRACT

An antenna port for an extended Physical Downlink Control CHannel (ePDCCH) transmission is determined based on at least an identifier for a leading extended Control Channel Element (eCCE) within the ePDCCH and an identifier for a user equipment (UE) to receive the ePDCCH transmission, and based on whether the ePDCCH transmission is localized or distributed. The determined antenna port is a DeModulation Reference Signal (DMRS) port to which the UE is assigned. Symbols are mapped in sequence to resource elements (REs) and transmitted via the determined antenna port to the UE.

24 Claims, 11 Drawing Sheets

(51) Int. Cl.
*H04B 7/04* (2006.01)
*H04L 5/00* (2006.01)

(56) References Cited

FOREIGN PATENT DOCUMENTS

WO WO 2011/053073 A2 5/2011
WO WO 2011/140384 A1 11/2011

OTHER PUBLICATIONS

European Search Report dated Sep. 4, 2015 in connection with European Patent Application No. 13746601.7, 8 pages.
3GPP TSG RAN WG1 Meeting #68; "Search Space Design for E-PDCCH"; Dresden, Germany, Feb. 6-10, 2012; R1-120330; 6 pages.
3GPP TSG RAN WG1 Meeting #62; "UE specific search space design for cross-cell scheduling"; Madrid, Spain, Aug. 23-27, 2010; R1-104570; 10 pages.

* cited by examiner

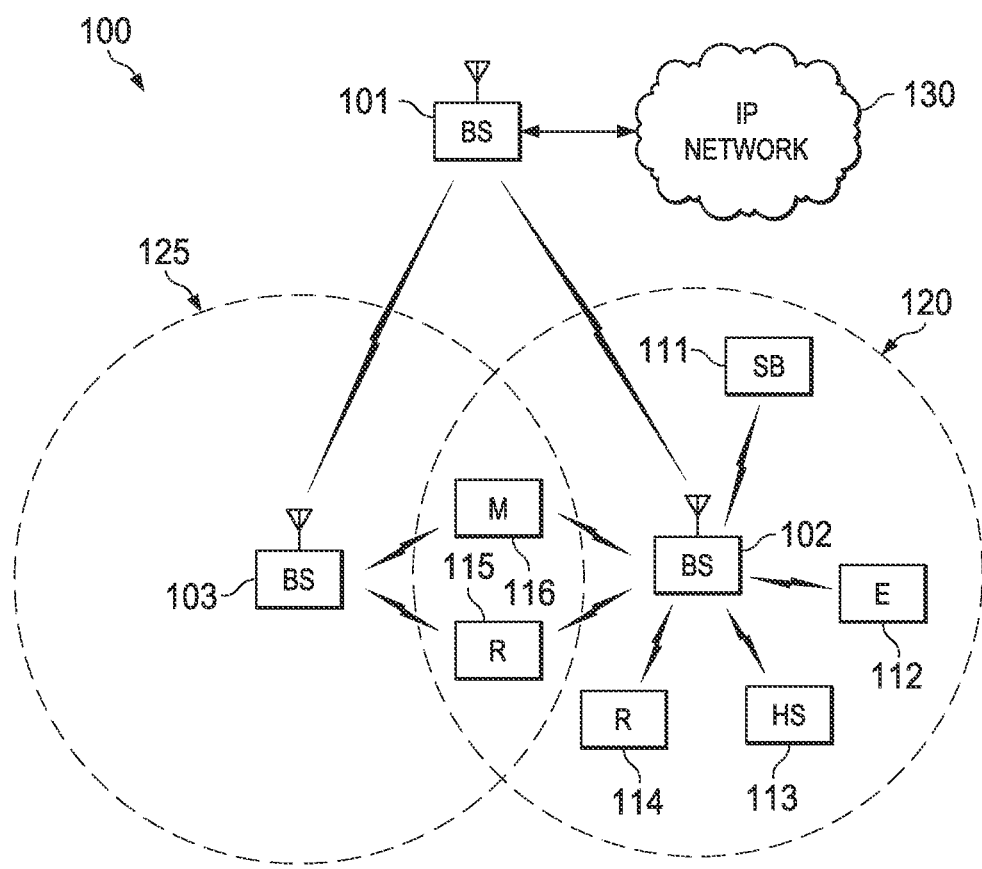

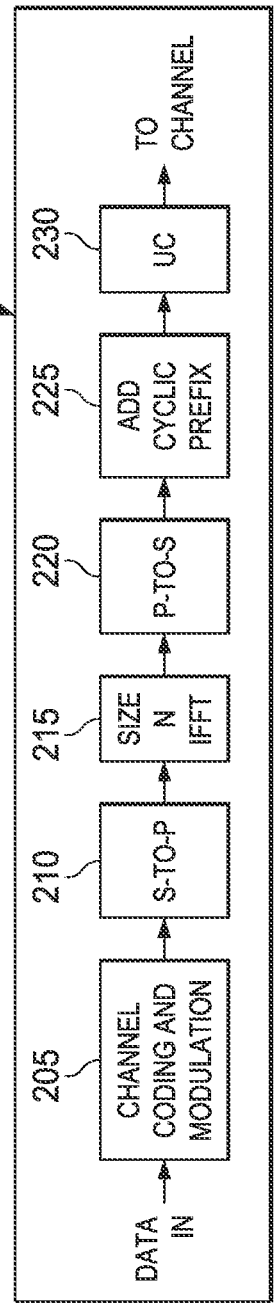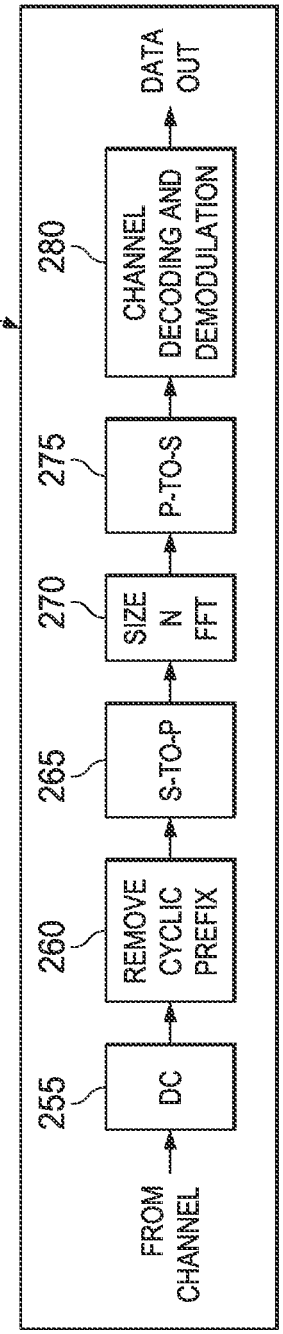

FIG. 6
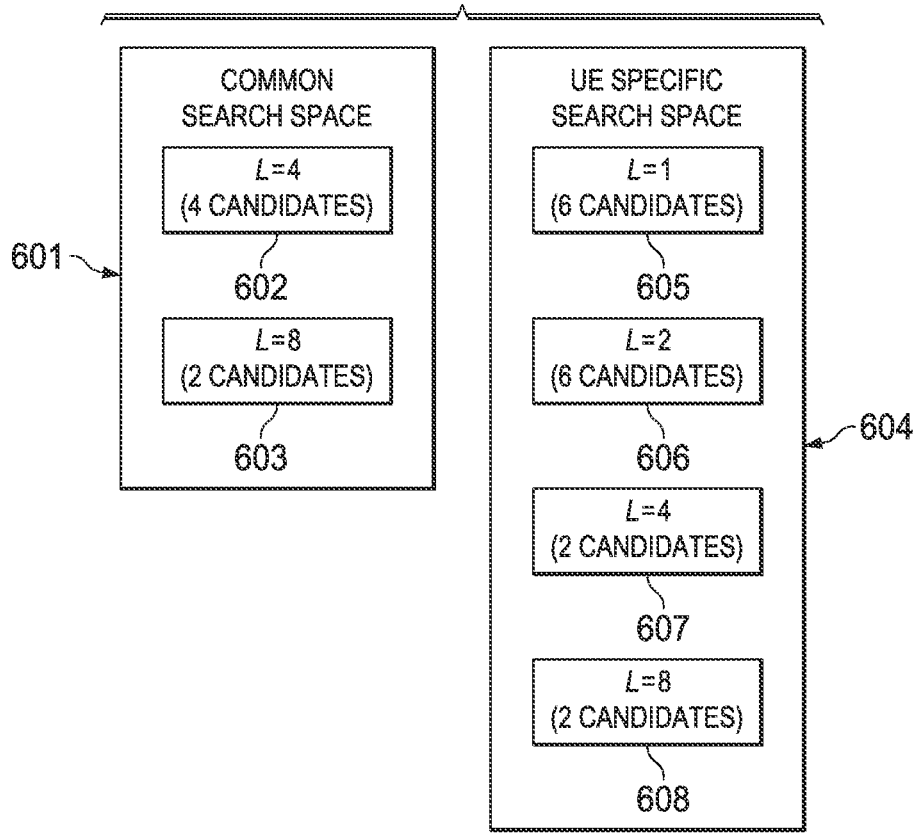
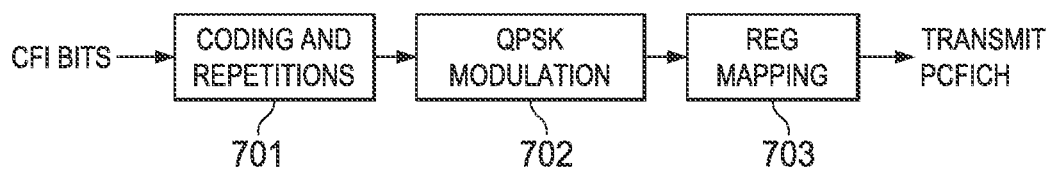
FIG. 7
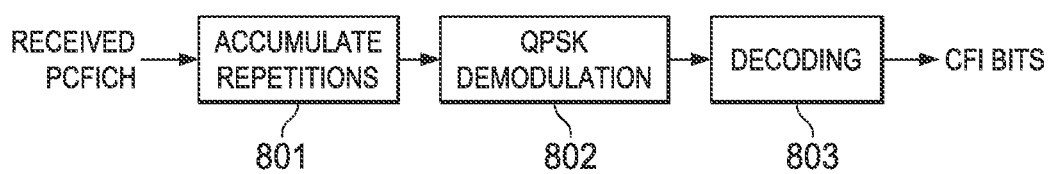
FIG. 8

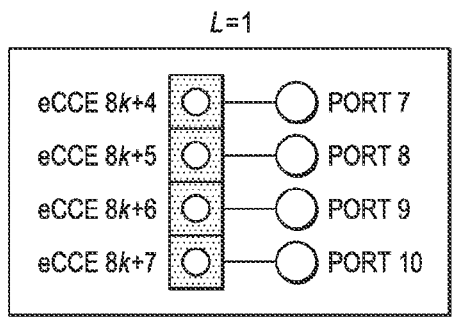
FIG. 16A
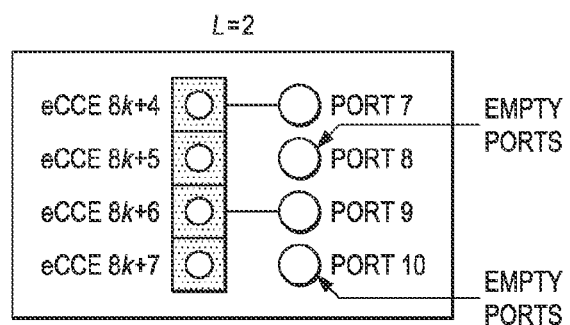
FIG. 16B
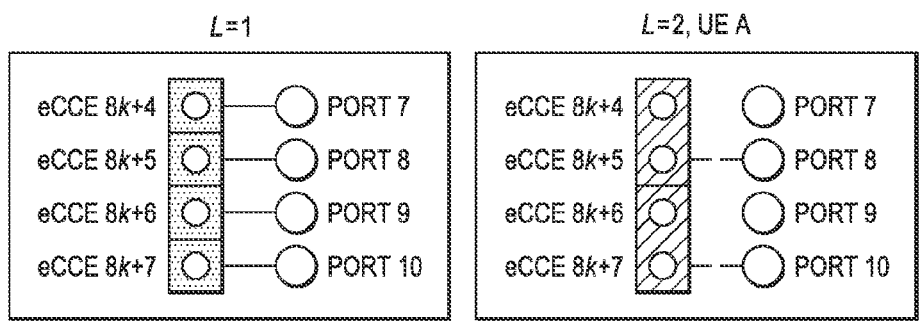
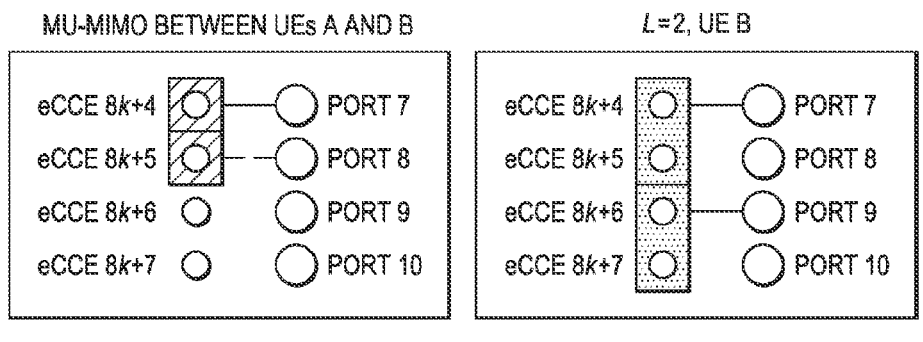
FIG. 17

METHODS AND APPARATUS FOR DOWNLINK CONTROL CHANNELS TRANSMISSIONS IN WIRELESS COMMUNICATIONS SYSTEMS

This application incorporates by reference the content of U.S. Provisional Patent Application No. 61/596,079, filed Feb. 7, 2012, entitled "METHODS AND APPARATUS ON DOWNLINK CONTROL CHANNELS TRANSMISSIONS IN WIRELESS COMMUNICATIONS SYSTEMS," and U.S. Provisional Patent Application No. 61/613,839, filed Mar. 21, 2012, entitled "METHODS AND APPARATUS ON THE SEARCH SPACE DESIGN OF DOWNLINK CONTROL CHANNELS IN WIRELESS COMMUNICATIONS SYSTEMS."

TECHNICAL FIELD

The present disclosure relates generally to wireless communications, and more particularly, to providing extended downlink control channels transmission in wireless communication systems.

BACKGROUND

In the 3rd Generation Partnership Project (3GPP) Long Term Evolution (LTE) release-8 (Rel-8), release-9 (Rel-9), and release-10 (Rel-10), the Physical Downlink Control CHannel (PDCCH), the Physical Control Format Indicator CHannel (PCFICH), and the Physical Hybrid-ARQ Indicator CHannel (PHICH) are transmitted in the first a few limited Orthogonal Frequency Division Multiplexing (OFDM) symbols of each subframe. As a consequence, that control region has limited capacity. In addition, interference co-ordination in the frequency domain cannot be achieved.

Therefore, there is a need in the art for extending the control region in the Physical Downlink Shared CHannel (PDSCH) region to expand the capacity of the control region.

SUMMARY

An antenna port for an extended Physical Downlink Control CHannel (ePDCCH) transmission is determined based on at least an identifier for a leading extended Control Channel Element (eCCE) within the ePDCCH and an identifier for a user equipment (UE) to receive the ePDCCH transmission, and based on whether the ePDCCH transmission is localized or distributed. The determined antenna port is a DeModulation Reference Signal (DMRS) port to which the UE is assigned. Symbols are mapped in sequence to resource elements (REs) and transmitted via the determined antenna port to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an exemplary wireless network within which downlink control channel transmissions may be performed according to embodiments of the present disclosure;

FIGS. 2A and 2B illustrate exemplary transmit path and receive paths, respectively, for a wireless communications system within which downlink control channel transmissions may be performed according to certain embodiments of the present disclosure;

FIG. 6 illustrates search spaces defined in the LTE system;

FIG. 7 illustrates one possible base station transmitter chain for transmission of a PCFICH having the structure depicted in FIG. 3;

FIG. 8 illustrates the receiver chain for reception of a PCFICH having the structure depicted in FIG. 3;

FIGS. 16A and 16B illustrate DMRS port linkage according to certain embodiments of the present disclosure; and FIG. 17 illustrates the DMRS port linkage according to certain embodiments of the present disclosure.

DETAILED DESCRIPTION

Figure 3:
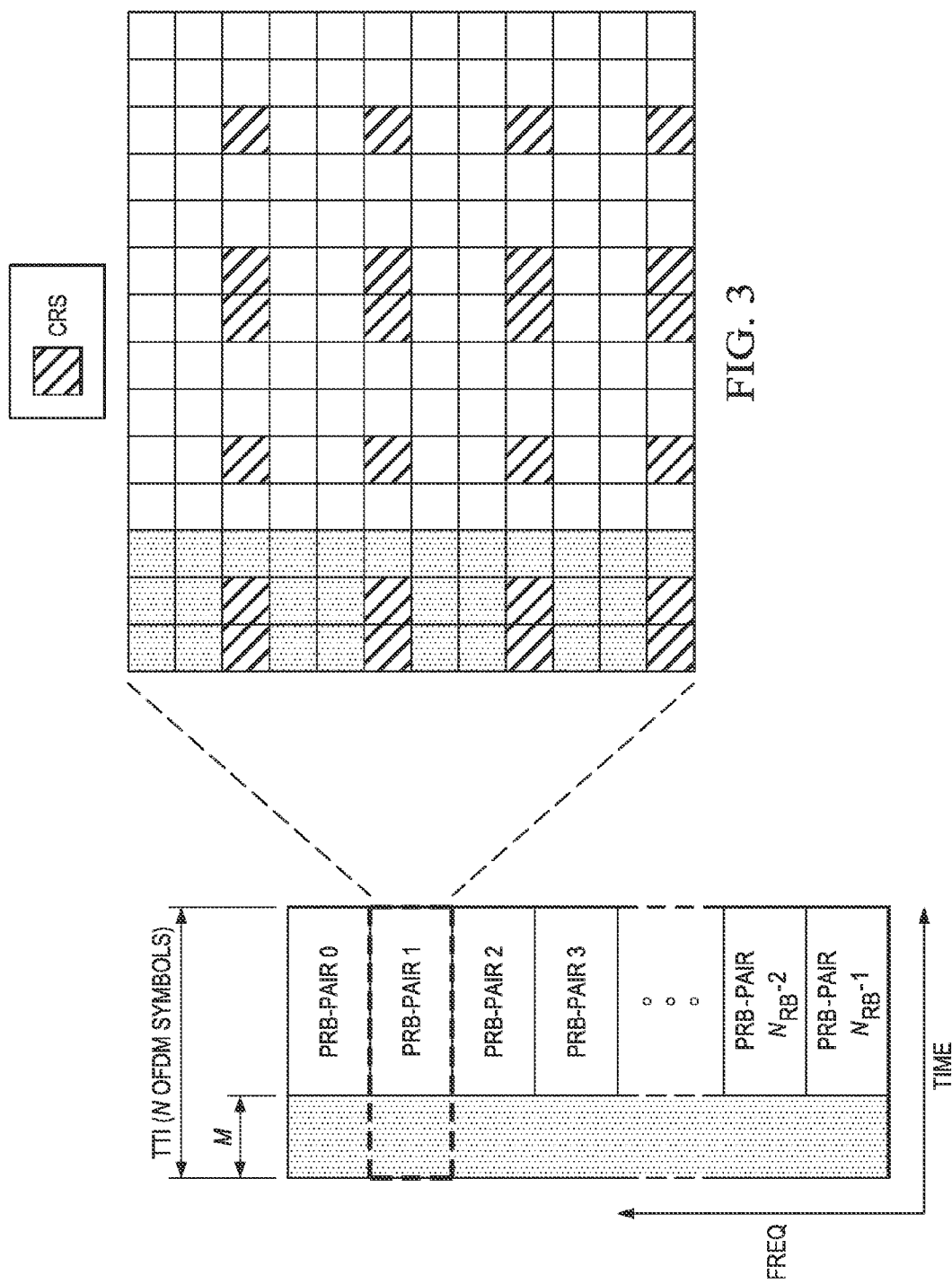
FIG. 3 illustrates one possible DownLink (DL) Transmit Time Interval (TTI) structure for transmitting Control CHannels (CCHs)

FIGS. 1 through 17, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged wireless communications system.

With regard to the following description, it is noted that the 3GPP Long Term Evolution (LTE) term "node B" or "evolved node B (eNB) is another term for "base station" (BS) used below. Also, the LTE term "user equipment" or "UE" is another term for "subscriber station" (SS) or "mobile station" (MS) used below.

FIG. 1 illustrates an exemplary wireless network 100 within which downlink control channel transmissions may be performed according to embodiments of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In certain embodiments, SS 111 may be located in a small business (SB), SS 112 may be located in an enterprise (E), SS 113 may be located in a Wireless Fidelity (WiFi) hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In certain embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In certain embodiments, base stations 101-103 may communicate with each other and with subscriber stations 111-116 using an Institute for Electrical and Electronic Engineers (IEEE) 802.16 wireless metropolitan area network standard, such as, for example, an IEEE-802.16e standard. In certain embodiments, however, a different wireless protocol may be employed, such as, for example, a HIPERMAN wireless metropolitan area network standard. Base station 101 may communicate through direct line-of-sight (LOS) or non-line-of-sight (NLOS) with base station 102 and base station 103, depending on the technology used for the wireless backhaul. Base station 102 and base station 103 may each communicate through non-line-of-sight with subscriber stations 111-116 using OFDM and/or Orthogonal Frequency Division Multiple Access (OFDMA) techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In certain embodiments, one or more of subscriber stations 111-116 may be associated with an access point (AP) of a WiFi Wireless Local Area Network (WLAN). Subscriber station 116 may be any of a number of mobile devices, including a wireless-enabled laptop computer, tablet, smart phone, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In certain embodiments, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using a minimum mean squared error (MMSE) or MMSE-successive interference cancellation (SIC) algorithm. As described in more detail below, the receiver is operable to determine a decoding order for the data streams based on a decoding prediction metric for each data stream that is calculated based on a strength-related characteristic of the data stream. Thus, in general, the receiver decodes the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

FIGS. 2A and 2B illustrate exemplary transmit path and receive paths, respectively, for a wireless communications system within which downlink control channel transmissions may be performed according to certain embodiments of the present disclosure. In FIGS. 2A and 2B, the OFDMA transmit path is depicted as implemented in base station (BS) 102 and the OFDMA receive path is depicted as implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the present disclosure. It will be appreciated that in an alternate embodiment of the present disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g. Turbo coding) and modulates (e.g., Quadrature Phase Shift Key or "QPSK," Quadrature Amplitude Modulation or "QAM") the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

FIG. 3 illustrates one possible DownLink (DL) Transmit Time Interval (TTI) structure for transmitting Control CHannels (CCHs), which for brevity is assumed to consist of one subframe having N=14 OFDM symbols.

The DL signals consist of data signals carrying information content, control signals, and Reference Signals (RSs), which are also known as pilot signals. The base station conveys data information to UEs through respective Physical Downlink Shared CHannels (PDSCHs) and conveys control information through respective Physical Downlink Control CHannels (PDCCHs). The UpLink (UL) of the communication system involves transmissions of signals from UEs to the base station. The UL signals also consist of data signals, control signals and RSs. UEs convey data signals to the base stations through respective Physical Uplink Shared CHannels (PUSCHs) and control signals through respective Physical Uplink Control CHannels (PUCCHs). A UE having a PUSCH transmission may multiplex control information with data information in the PUSCH.

DCI serves several purposes and is conveyed through DCI formats transmitted in respective PDCCHs. For example, DCI includes DL Scheduling Assignments (SAs) for PDSCH reception and UL SAs for PUSCH transmission. As the PDCCH is a major part of the total DL overhead, it directly impacts the DL throughput. One method for reducing PDCCH overhead is to scale its size according to the resources required to transmit the DCI formats during a DL TTI. Assuming OFDM as the DL transmission method, a Control Format Indicator (CFI) parameter transmitted through the Physical Control Format Indicator CHannel (PC-FICH) can be used to indicate the number of OFDM symbols occupied by the PDCCH.

The transmission of CCHs occupies the first M OFDM symbols of the DL TTI, as illustrated by the light gray shading in FIG. 3. The remaining N-M OFDM symbols are used primarily for PDSCH transmissions. The B and Width (BW) unit in time and frequency for PDSCH and PUSCH transmissions is referred to as a Physical Resource Block (PRB). A PRB consists of several sub-carriers, referred to as Resource Elements (REs). REs have a time duration of 1 OFDM symbol, and are depicted as the small squares in the enlarged view of PRB pair 1 in FIG. 3. In the example depicted, each PRB comprises 12 REs and has a time-domain duration of 1 slot, which in the example depicted comprises 7 OFDM symbols. A PRB-pair is a pair of the PRBs which occupy the first and second slots in a subframe. There are $N_{RB}$ PRB pairs over the entire DL BW. The PCFICH is transmitted in several frequency disperse quadruplets of REs, referred to as RE Groups (REGs), in the first OFDM symbol and conveys a Control Format Indicator (CFI) of 2 bits indicating a control region size of M=1, M=2, or M=3 OFDM symbols. Some OFDM symbols contain RS REs for each base station transmitter antenna port. These RS REs are dispersed across substantially the entire DL BW, are referred to as Cell-specific RSs (CRSs), and can be used by each UE to estimate its DL channel medium and perform other measurements. CRSs are depicted with dark gray shading in FIG. 3.

In addition to the CRSs in FIG. 3, other RS types that may exist in a DL subframe include: the DeModulation Reference Symbol (DMRS), which is transmitted only in the PRBs used for PDSCH transmission and is UE-specific; and the Channel State Information RS (CSI-RS), which is periodically transmitted in some subframes and is intended to serve as a replacement of the CRS.

Additional control channels may be transmitted in the control region of a DL subframe but, for brevity, they are not shown in FIG. 3. For example, assuming the use of hybrid automatic repeat request (HARQ) for data transmissions in a PUSCH, the base station can transmit HARQ ACKnowledge (HARQ-ACK) information in a Physical Hybrid-HARQ Indicator CHannel (PHICH) to indicate to each UE whether a previous transmission of each data Transport Block (TB) in a PUSCH was correctly received (ACK) or incorrectly received (NACK). All CCHs, including PDCCH, PCFICH, and PHICH, are assumed to be transmitted over a number of REGs.

Figure 4:
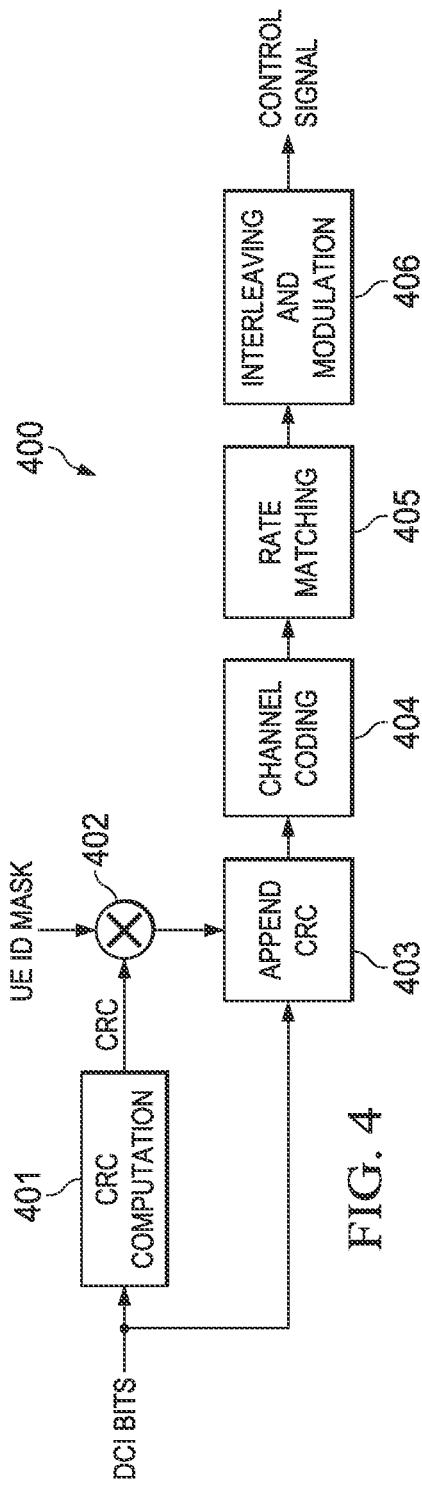
FIG. 4 illustrates one possible base station transmitter chain for transmission of a Downlink Control Information (DCI) format in a PDCCH having the structure depicted in FIG. 3.

FIG. 4 illustrates the base station transmitter functions for transmission of a DCI format in a PDCCH having the structure depicted in FIG. 3. The base station separately codes and transmits each DCI format in a respective PDCCH.

A UE identity (UE_ID) for which a DCI format is intended to mask the Cyclic Redundancy Check (CRC) of the received DCI format codeword bits, in order to enable the UE to identify the particular DCI format that is intended for that UE. Alternatively, a DCI-type ID may mask the CRC if the DCI format provides information that can be common to UEs. The CRC of the non-coded DCI format bits is computed by CRC computation unit 401 of the exemplary transmitter processing system 400 and is subsequently masked using the exclusive OR (XOR) operation 402 between CRC and UE_ID bits. The masked CRC is then appended to the DCI format bits in unit 403, and channel coding is performed in unit 404 using, e.g., a convolutional code, followed by rate matching in unit 405 to the allocated resources, and finally by interleaving, modulation, and transmission of the control signal by unit 406. For example, both the CRC and the UE_ID or the DCI-type ID consist of 16 bits.

Figure 5:
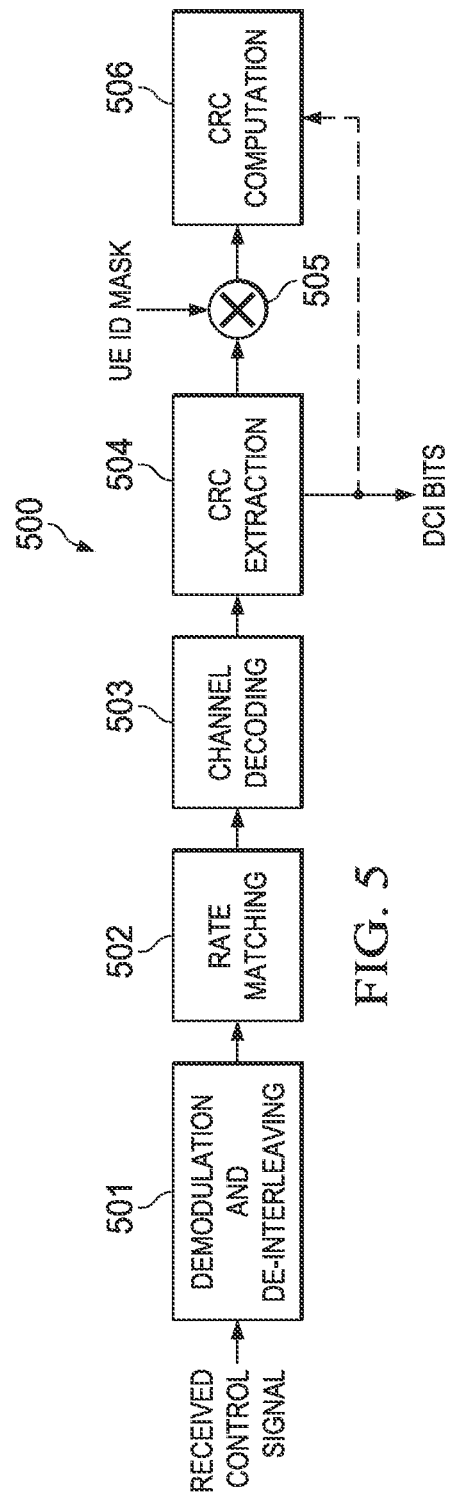
FIG. 5 illustrates one possible UE receiver chain for reception of a DCI in a PDCCH having the structure depicted in FIG. 3.

FIG. 5 illustrates the UE receiver functions for the reception of a DCI in a PDCCH having the structure depicted in FIG. 3. The exemplary receiver system 500 in UE receives and demodulates the received control signal and then de-interleaves the resulting bits in unit 501, restores the rate matching applied at the base station transmitter in unit 502, and subsequently decodes the encoded control information in unit 503. After decoding, the UE obtains the DCI bits in unit 504 after extracting the CRC bits, which are then de-masked by applying the XOR operation 505 with the UE_ID or the DCI-type ID. Finally, the UE receiver performs a CRC test on the DCI bits in unit 506. If the CRC test passes, the UE considers the DCI format as a valid one and determines the parameters for signal reception in a PDSCH or for signal transmission in a PUSCH. If the CRC test does not pass, the UE disregards the presumed DCI format.

To avoid a PDCCH transmission to a UE blocking a PDCCH transmission to another UE, a PDCCH location in the control region is not unique and, as a consequence, each UE needs to perform multiple PDCCH decoding operations per subframe in order to determine whether there is a PDCCH intended for that UE. The REs carrying a PDCCH are grouped into CCEs in the logical domain. For a given number of DCI bits, the number of CCEs for the respective PDCCH depends on the channel coding rate. Here, QPSK is assumed as the modulation scheme. The base station may use a lower channel coding rate and more CCEs for PDCCH transmissions to UEs experiencing low DL signal-to-interference and noise ratio (SINR) than to UEs experiencing a high DL SINR. The CCE aggregation levels can consist, for example, of 1, 2, 4, and 8 CCEs.

For the PDCCH decoding process, a UE may determine a search space for candidate PDCCH transmissions after the UE restores the CCEs in the logical domain according to a common set of CCEs for all UEs (Common Search Space or CSS) and according to a UE-dedicated set of CCEs (UE-specific Search Space or UE-SS). The CSS may consist of the first CCEs in the logical domain. The UE-SS may be determined according to a pseudo-random function having as inputs UE-common parameters, such as the subframe number or the total number of CCEs in the subframe, and UE-specific parameters such as the UE_ID. For example, for CCE aggregation levels L∈{1, 2, 4, 8}, the CCEs corresponding to PDCCH candidate m are given by:

$$L \cdot \{(Y_k + m') \bmod \lfloor N_{CCE,k}/L \rfloor\} + i \quad (1)$$

where $N_{CCE,k}$ is the total number of CCEs in subframe k and i=0, ... L−1. For the CSS, m'=m. For the UE-SS, for the serving cell on which the PDCCH is monitored, if the monitoring UE is configured with a carrier indicator field, then m'=m+M$^{(L)}$·n$_{CI}$, where n$_{CI}$ is the carrier indicator field value. Otherwise, if the monitoring UE is not configured with a carrier indicator field, then m'=m, where m=0, . . . , M$^{(L)}$−1, and M$^{(L)}$ is the number of PDCCH candidates to monitor in the search space. Exemplary values of M$^{(L)}$ for L∈{1, 2, 4, 8} are, respectively, {6, 6, 2, 2}. For the CSS, $Y_k$=0. For the UE-SS, $Y_k$=(A·$Y_{k-1}$)mod D, where $Y_{k-1}$=UE_ID≠0, A=39827 and D=65537.

DCIs conveying information to multiple UEs are transmitted in the CSS. Additionally, if enough CCEs remain after the transmission of DCIs conveying information to multiple UEs, the CSS may also convey some UE-specific DCIs for PDSCH reception or PUSCH transmission. The UE-SS exclusively conveys UE-specific DCIs for PDSCH reception or PUSCH transmission. For example, the CSS may consist of 16 CCEs and support 2 PDCCH candidates with L=8 CCEs, or 4 PDCCH candidates with L=4 CCEs. The CCEs for the CSS are placed first in the logical domain (prior to interleaving).

FIG. 6 illustrates search spaces defined in the LTE system. The CSS 601 supports 4 PDCCH candidates 602 with L=4 and 2 PDCCH candidates 603 with L=8. The UE-SS 604 supports {6, 6, 2, 2} PDCCH candidates 605, 606, 607 and 608 with L={1, 2, 4, 8}, respectively.

FIG. 7 illustrates one possible base station transmitter chain for transmission of a PCFICH having the structure depicted in FIG. 3. The system 700 within the base station transmitter generates two CFI bits, then encodes the CFI bits and performs a number of repetitions to obtain a sequence of encoded CFI bits in unit 701. A (3, 2) Hamming code and 11 repetitions of the encoded CFI bits are applied to obtain sequences of 32 encoded bits after puncturing the last repeated encoded bit. The sequences of encoded bits are modulated using QPSK in unit 702, and the output is mapped to frequency dispersed REGs in unit 703 and transmitted in a PCFICH.

FIG. 8 illustrates one possible receiver chain for reception of a PCFICH having the structure depicted in FIG. 3. The system 800 within the UE receiver obtains the PCFICH, accumulates the repeated transmissions of the encoded CFI bits over the respective REGs in unit 801, demodulates the accumulated output in unit 802, decodes the resulting bits in unit 803, and thereby obtains an estimate of the transmitted CFI bits.

The PHICH REGs may be placed only in the first OFDM symbol or be distributed over the maximum of three OFDM symbols of the CCH region. PHICH transmission in each REG is not confined in only one RE but, in order to provide interference randomization, is spread over all REs in each REG. To avoid reducing the PHICH multiplexing capacity, orthogonal multiplexing of PHICH transmissions may apply within each REG using orthogonal codes with Spreading Factor (SF) equal to $N_{SF,freq}^{PHICH}$. For a REG of 4 REs, the orthogonal codes are Walsh-Hadamard (WH) codes with $N_{SF,freq}^{PHICH}=4$. For QPSK modulation and 1-bit HARQ-ACK for each data TB received by the base station, each PHICH may be placed on the In-phase (I) or Quadrature (Q) component of the QPSK constellation and be further modulated with a WH code over each REG. For $N_{SF,freq}^{PHICH}=4$, the 1-bit HARQ-ACK multiplexing capacity of each PHICH is $2N_{SF,freq}^{PHICH}=8$ (obtained from the 2 dimensions of the QPSK constellation (I/Q) and from the $N_{SF,freq}^{PHICH}=4$ of the WH code). Therefore, multiple PHICHs separated through I/Q multiplexing and through different WH codes are mapped to the same set of REs in one or more REGs and constitute a PHICH group. The scheme of I/Q and WH code multiplexing in PHICH transmission is equivalent to the orthogonal multiplexing scheme using the sequence given in the exemplary Table 1:

TABLE 1

| Sequence index | Orthogonal sequence |
| --- | --- |
| 0 | [+1 +1 +1 +1] |
| 1 | [+1 −1 +1 −1] |
| 2 | [+1 +1 −1 −1] |
| 3 | [+1 −1 −1 +1] |
| 4 | [+j +j +j +j] |
| 5 | [+j −j +j −j] |
| 6 | [+j +j −j −j] |
| 7 | [+j −j −j +j] |

A PHICH resource is identified by then pair $(n_{PHICH}^{group}, n_{PHICH}^{seq})$ where $n_{PHICH}^{group}$ is a PHICH group number and $n_{PHICH}^{seq}$ is a WH code index within the group. The number of PHICH groups is $N_{PHICH}^{group}=\lceil N_g(N_{RB}/8)\rceil$ where $N_g \in \{1/6, 1/2, 1, 2\}$ is a parameter informed to UEs through a broadcast channel, and $N_{RB}$ is the total number of DL PRBs in the DL BW. The UE is informed of $N_{RB}$ prior to any PHICH reception. The PHICH group number is determined as $$n_{PHICH}^{group}=(+CSI) \bmod N_{PHICH}^{group} \qquad (2)$$

and the WH code index within the group is determined as $$n_{PHICH}^{seq}=(\lfloor I_{PRB\_RA}^{lowest\_index}/N_{PHICH}^{group}\rfloor + CSI) \bmod 2N_{SF,freq}^{PHICH} \qquad (3)$$

Where $I_{PRB\_RA}^{lowest\_index}$ is the smallest PRB index of the PUSCH conveying the data TB corresponding to the HARQ-ACK bit transmitted in the PHICH, and CSI is the cyclic shift index (CSI) of the CAZAC sequence used for the RS transmission in the PUSCH.

The control region for transmissions of CCHs uses a maximum of M=3 OFDM symbols and each CCH is transmitted over substantially the entire DL BW. As a consequence, the control region has limited capacity and cannot achieve interference co-ordination in the frequency domain. There are several cases where expanded capacity or interference co-ordination in the frequency domain is needed for transmissions of CCHs: one such case is for cell aggregation where DL SAs or UL SAs scheduling respective PDSCHs or PUSCHs to a UE in multiple cells are transmitted in a single cell; another case is the extensive use of spatial multiplexing where multiple DL SAs or UL SAs schedule respective PDSCHs or PUSCHs in the same resources; and another case is when DL transmissions in one cell experience strong interference from DL transmissions in another cell and DL interference co-ordination in the frequency domain between the two cells is needed.

Due to the REG-based transmission and interleaving of CCHs, the control region cannot be expanded to include more OFDM symbols while maintaining compatible operation with existing UEs that cannot be aware of such expansion. A solution for this issue is to extend the control region in the PDSCH region and use individual PRBs for transmission of new CCHs, which will be referred to herein as Extended CCHs (eCCHs) and include ePDCCH, ePCFICH, and ePHICH.

The operational functionality of an extended control region and of eCCHs transmitted in PRBs in the PDSCH region of a DL subframe to enable multi-user Multiple Input, Multiple Output (MIMO) transmission of ePDCCHs is described below. The present disclosure also presents a new search space design for ePDCCHs.

Localized ePDCCH & Distributed ePDCCH

Figure 9:
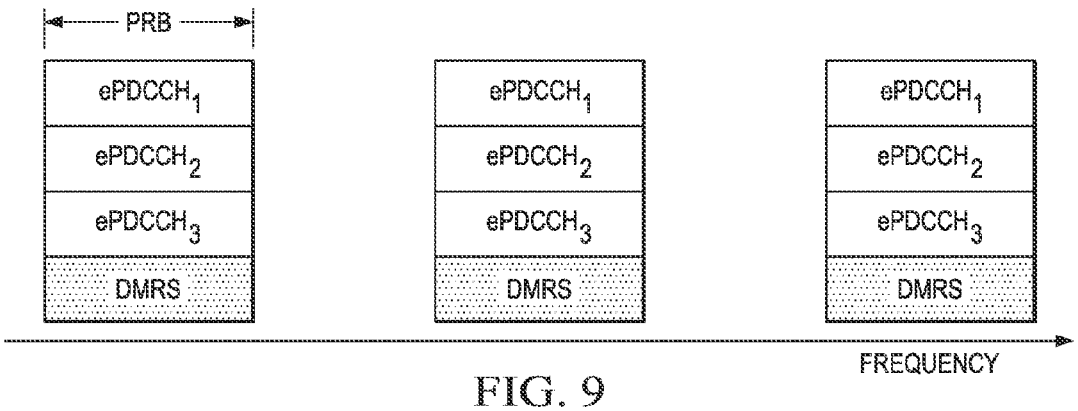
FIG. 9 illustrates the distributed transmission of ePDCCHs according to certain embodiments of the present disclosure.

FIG. 9 illustrates the distributed transmission of ePDCCHs according to certain embodiments of the present disclosure. An ePDCCH is distributed over multiple distributed PRBs to obtain frequency diversity gain as well as interference diversity gain, as shown in FIG. 9. Since HARQ is not applied to ePDCCH, robust transmission of ePDCCH is important. Distributed PRB transmission enables robust transmission by achieving frequency diversity. The group-UE-specific DMRS is used for the UEs to estimate the channel response for demodulation. In the embodiment shown in FIG. 9, the UEs receiving ePDCCHs 1, 2, and 3 use the same respective DMRS for demodulation of those ePDCCHs.

Figure 10:
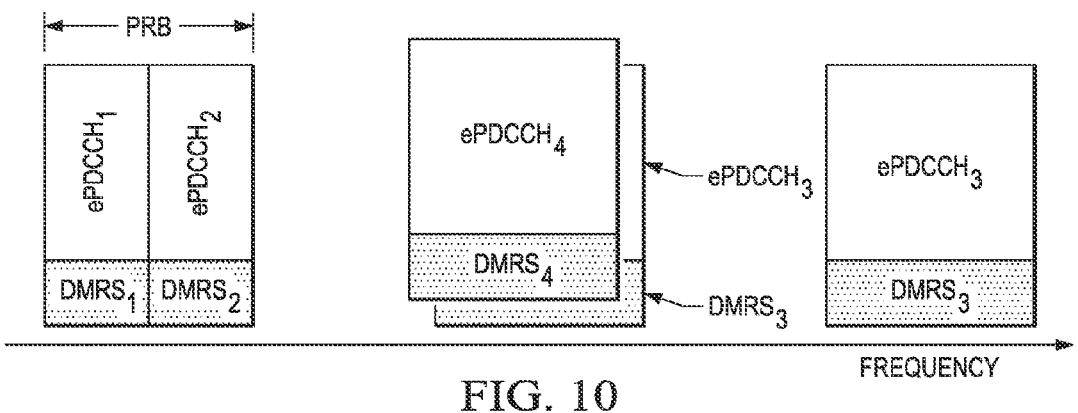
FIG. 10 illustrates localized transmission of ePDCCHs according to certain embodiments of the present disclosure.

FIG. 10 illustrates localized transmission of ePDCCHs according to certain embodiments of the present disclosure. An ePDCCH is transmitted on one or more PRB part(s) using its own UE-specific DMRS, as illustrated in FIG. 10, where a PRB-pair consists of one or multiple PRB part(s).

This transmission scheme is intended to maximize beamforming gain for the ePDCCH. Furthermore, the transmission scheme is suitable for multi-user MIMO transmissions of ePDCCHs. Therefore, reasonably accurate channel knowledge at a base station is necessary. If the channel knowledge at the base station is inaccurate, then the base station may need to consider a relatively large margin in resource allocation for robustness. The UE-specific DMRS is used for the UEs to estimate the channel response for demodulation. In the embodiment illustrated in FIG. 10, the UEs receiving ePDCCHs 1, 2, and 3 use their own DMRS ($DMRS_1$, $DMRS_2$ or $DMRS_3$) for demodulation.

New Control Region in the PDSCH Region

Introduction of distributed transmission and localized transmission of ePDCCHs brings a need to develop a scheme for multiplexing the different types of ePDCCHs. Since distributed ePDCCH and localized ePDCCH cannot occupy the same PRB, frequency division multiplexing is the most natural solution. The UEs should be aware of which PRBs are reserved as the distributed ePDCCH region or the localized ePDCCH region. This indication may be signaled via a higher layer and/or the physical layer.

Figure 11:
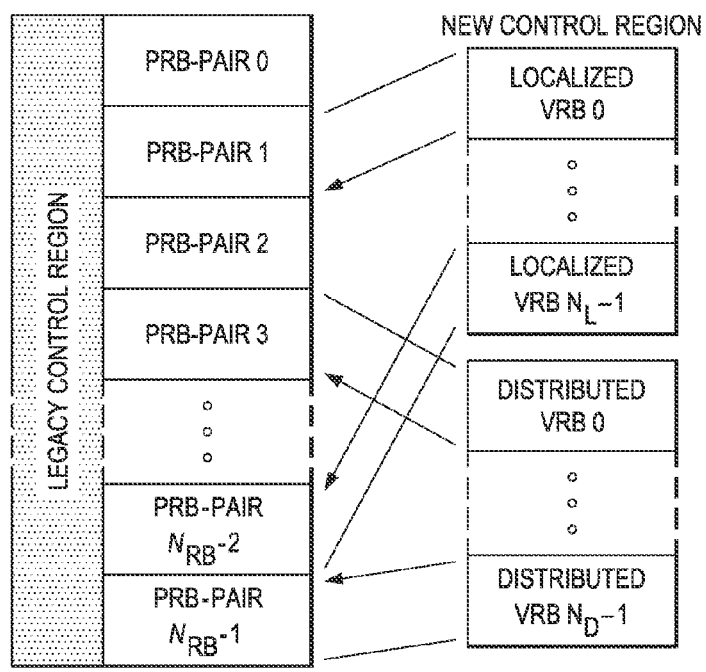
FIG. 11 illustrates the control regions mapping according to certain embodiments of the present disclosure.

FIG. 11 illustrates an exemplary new control regions mapping according to one embodiment of the present disclosure. Virtual Resource Blocks (VRBs) are the logical BW unit and the mapping rule between VRBs and PRB-pairs is predefined. VRBs are preferably addressed to indicate a PRB-pair assuming a predefined mapping rule. Consecutive VRBs are distributed over the entire DL BW. A VRB consists of multiple eREGs and is mapped to a PRB. Multiple eREGs construct an eCCE. The number of eREGs forming an eCCE is fixed in the distributed region (e.g., an eCCE=9 REGs), while that number is nonetheless variable depending on the subframe type, the number of CRS ports, the presence of CSI-RS, etc. in the localized region. The eREGs forming an ePDCCH are distributed over multiple PRBs while the eREGs forming a cPDCCH are located in one or at most two PRBs. By doing so, both channel sensitive scheduling with appropriate beamforming for localized ePDCCHs and frequency diversity for distributed ePDCCH can be obtained.

In the embodiment illustrated in FIG. 11, $N_L$ VRBs are reserved as the localized control region and $N_D$ VRBs are reserved as the distributed control region. In the example depicted, the localized VRBs are dispersed non-contiguously among PRB-pair 1 through PRB-pair $N_{RB}-2$, the distributed VRBs are intermingled among the localized VRBs and are dispersed non-contiguously among PRB-pair 3 through PRB-pair $N_{RB}-1$. The values of $N_L$ and $N_D$ are configured by ePCFICH or a higher layer signaling. For example, both may be configured by a higher layer signaling without introducing ePCFICH. Another example is that $N_L$ is configured by a higher layer signaling while $N_D$ is configured by ePCFICH. Yet another example is that $N_L$ is configured by $ePCFICH_1$ while $N_D$ is configured by $ePCFICH_2$, with defining two ePCFICHs. The exact values of $N_L$ and $N_D$ can be dependent on the system BW.

eCCE Mappings and ePDCCHs Construction

Figure 12:
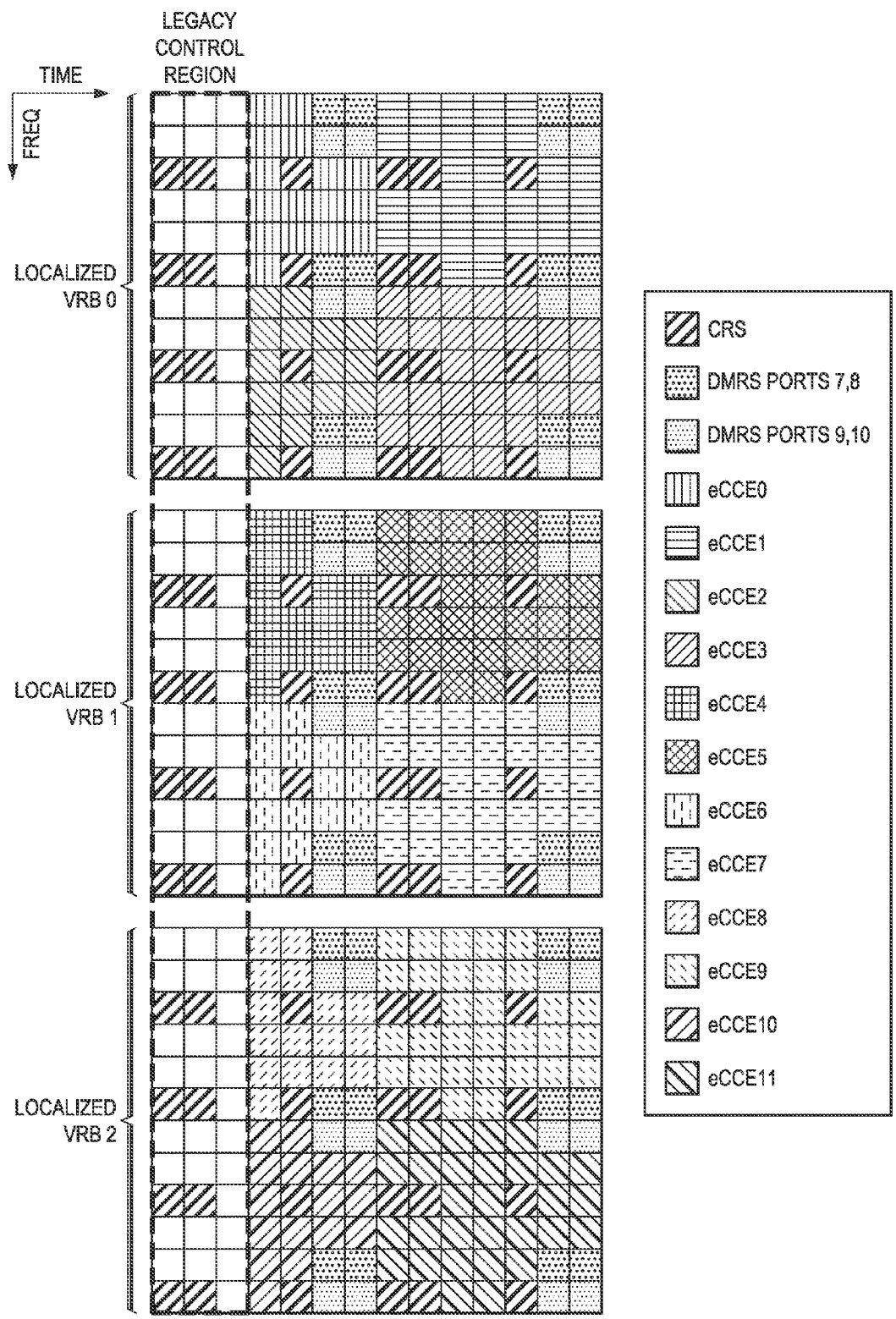
FIG. 12 illustrates the eCCE mapping in the localized VRBs according to according to certain embodiments of the present disclosure.

FIG. 12 illustrates an exemplary eCCE mapping in the localized VRBs with $N_L=3$ according to one embodiment of the present disclosure. The legacy control region of M OFDM symbols is retained; in the example of FIG. 12, M=3 as in FIG. 3. In addition, the CRSs occupy the same locations within and outside the legacy control region as in the exemplary structure of FIG. 3. The remaining REs outside the legacy control region in the three localized VRBs are associated with eCCEs. In this embodiment, an eREG consists of one RE and one VRB includes $N_{eCCEperVRB}$ eCCEs, where $N_{eCCEperVRB}=4$ in the example of FIG. 12. Here, $N_{eCCEperVRB}$ is the number of eCCEs per VRB. Even-numbered eCCHs are located in the first slot of a subframe and odd-numbered eCCHs are located in the second slot of a subframe. The structure of DMRS for eCCHs is same as that for PDSCH. The pair of DMRSs associated with antenna ports 7 and 8 (or corresponding antenna ports 107 and 108) are Code Division Multiplexed (CDMed) using the size-2 Walsh code on the REs of the DMRS antenna ports 7 and 8, and are depicted in FIG. 12 as speckled, without gray shading (the sixth, seventh, thirteenth and fourteenth OFDM symbols in each of the first, sixth, and eleventh rows of each of Localized VRB 0, Localized VRB 1 and Localized VRB2). Similarly, the pair of DMRSs associated with antenna ports 9 and 10 (or corresponding antenna ports 109 and 110) are also CDMed using the size-2 Walsh code on the REs of the DMRS antenna ports 9 and 10, and are depicted in FIG. 12 as speckled with light gray shading (the sixth, seventh, thirteenth and fourteenth OFDM symbols in each of the second, seventh, and twelfth rows of each of Localized VRB 0, Localized VRB 1 and Localized VRB2). Assuming the minimum aggregation level (AL) to construct an ePDCCH is 1, at most 4 ePDCCHs which occupy orthogonal resources in a localized VRB are defined. In the example of FIG. 12, the remaining REs outside the legacy control region in the upper left quadrant of Localized VRB 0 form eCCE0, depicted with vertical hatching, without gray shading. The otherwise unoccupied REs in the upper right quadrant of Localized VRB 0 form eCCE1, depicted with horizontal hatching, without gray shading. The otherwise unused REs outside the legacy control region in the lower left quadrant of Localized VRB 0 form eCCE2, depicted with vertical hatching with light gray shading. The otherwise unused REs in the lower right quadrant of Localized VRB 0 form eCCE3, depicted with horizontal hatching with light gray shading. The otherwise unused REs within Localized VRB similarly form eCCE4, eCCE5, eCCE6 and eCCE7, depicted with right-to-left diagonal hatching superimposed on the characteristics described above. The otherwise unused REs within Localized VRB 2 form eCCE8, eCCE9, eCCE10 and eCCE11, depicted with left-to-right diagonal hatching superimposed on the characteristics described above.

Figure 13:
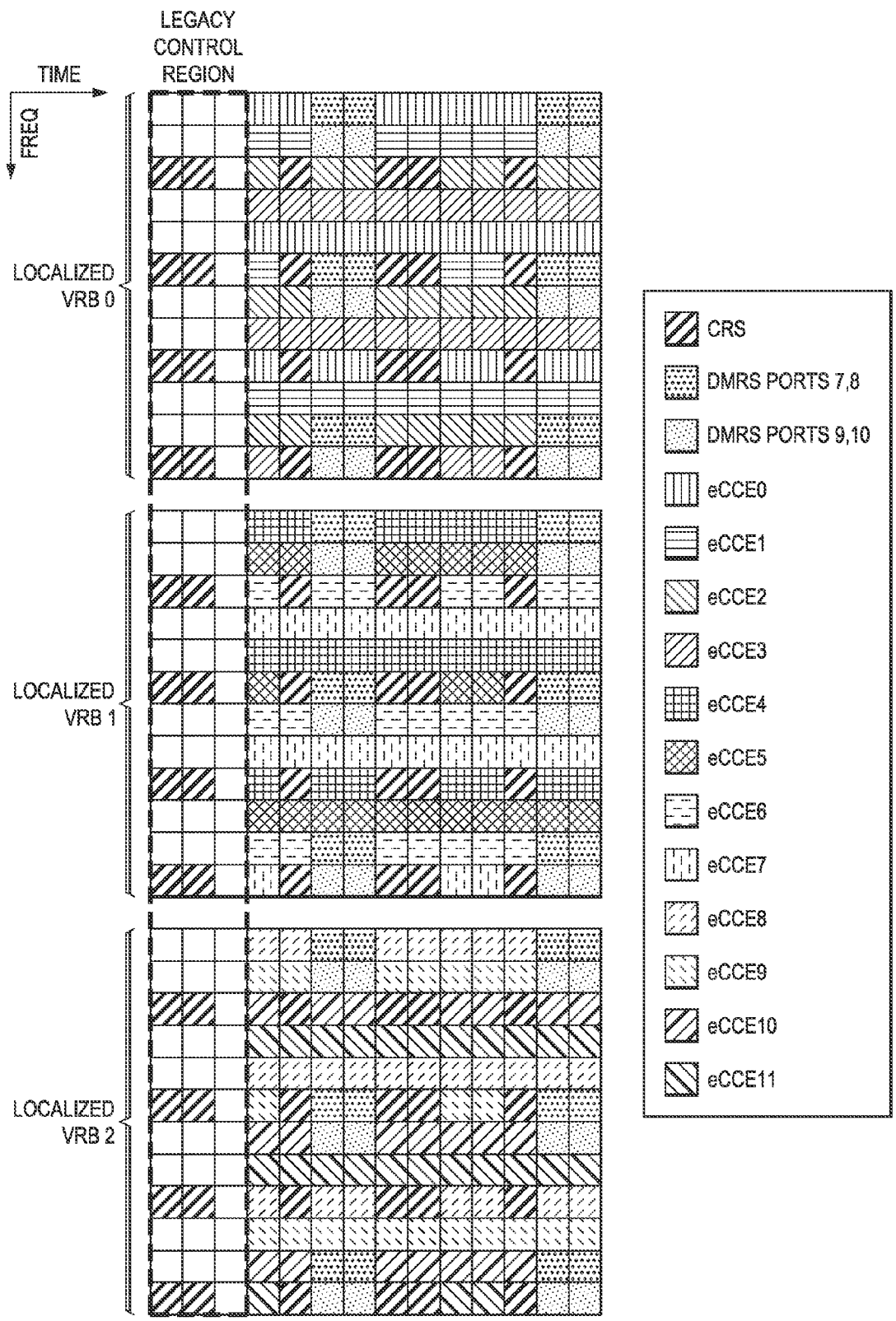
FIG. 13 illustrates the ePDCCHs construction in the localized VRBs according to certain embodiments of the present disclosure.

Alternatively, eCCEs can be mapped in the localized VRBs as illustrated in FIG. 13. As discussed above, one DMRS will be assigned to one ePDCCH in the localized VRBs. Since the DMRS REs are distributed in a VRB to obtain uniform channel estimation performance for any ePDCCHs, different eCCE mapping can be considered. In this embodiment, the REGs(=REs) of an eCCE are mapped in the time direction and then in the frequency direction in a VRB with a predefined frequency offset in subcarriers such that eCCHs within a VRB are interlaced in the frequency domain. As with the example of FIG. 12, the mapping should skip the REs which are preoccupied by other channels or signals, e.g. CRS, DMRS, PBCH, synchronization signals, and the like. In this embodiment, the predefined frequency offset is equal to $N_{eCCEperVRB}=4$. eCCE0 through eCCE11, depicted with the same characteristics as in FIG. 12, each occupy every fourth row of OFDM symbols in the respective Localized VRB 0, Localized VRB 1 and Localized VRB 2.

Figure 14:
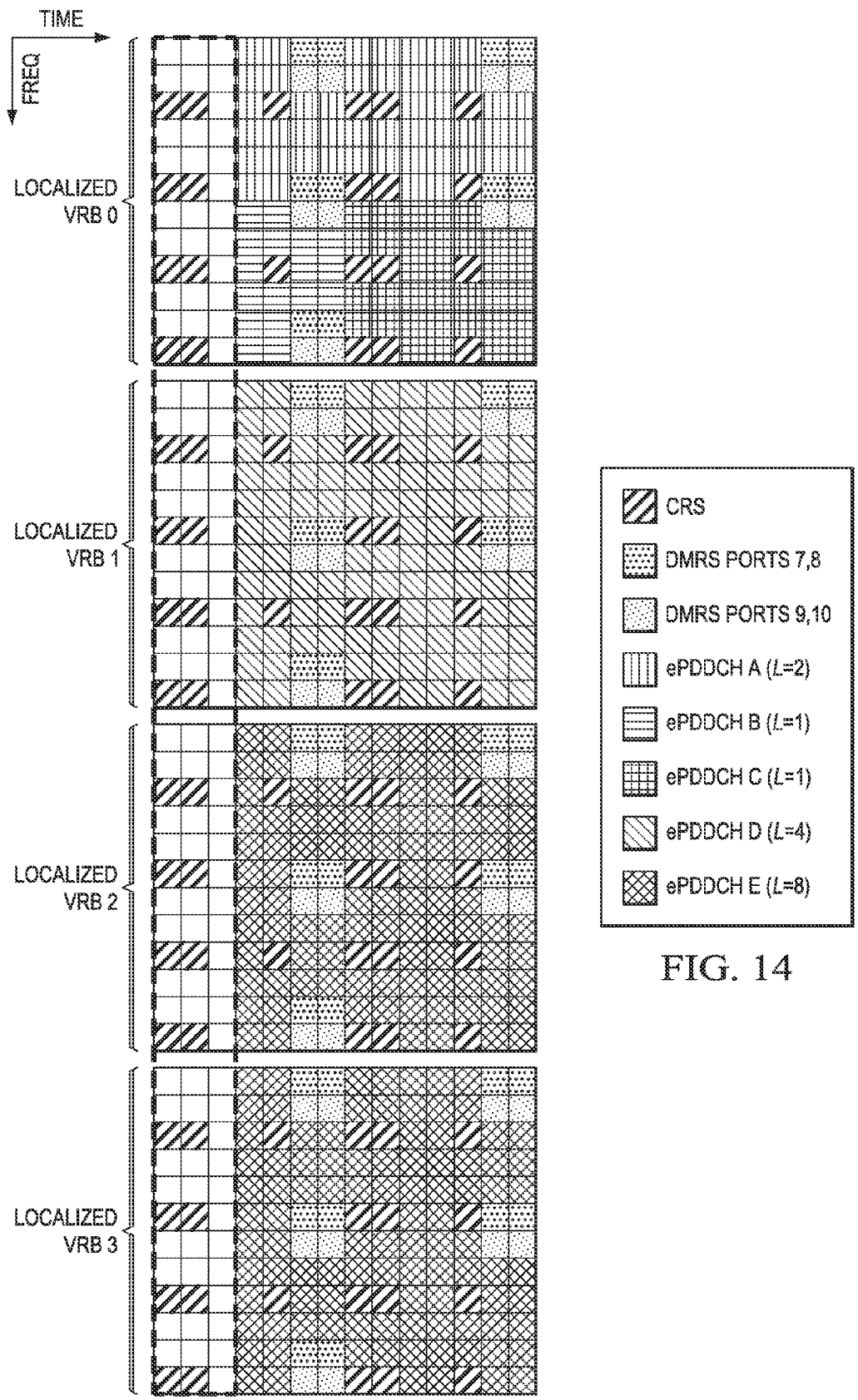
FIG. 14 illustrates the eCCE mapping in the localized VRBs according to certain embodiments of the present disclosure.

FIG. 14 illustrates one exemplary ePDCCH construction in the localized VRBs where $N_L=3$, assuming the eCCE mapping is the same as the embodiment illustrated in FIG. 12. An ePDCCH is constructed by aggregating L eCCHs, where $L \in \{2, 4, 8\}$. A higher aggregation level ePDCCH will be transmitted to relatively worse channel condition UE while a lower aggregation level ePDCCH will be transmitted to relatively better channel condition UE.

Referring to FIG. 14, the aggregation levels of ePDCCHs A, B, C, D, and E are 2, 1, 1, 4, and 8, respectively, and 5 ePDCCHs (A-E) are constructed as follows: ePDCCH A is constructed by aggregating eCCE0 and eCCE1 in FIG. 12; ePDCCH B is constructed by eCCE2 alone, as in FIG. 12; ePDCCH C is constructed by eCCE3 alone, as in FIG. 12; ePDCCH D is constructed by aggregating eCCE4, eCCE5, eCCE6, and eCCE7 in FIG. 12; and ePDCCH E is constructed by aggregating eCCE8, eCCE9, eCCE10, and eCCH11 in FIG. 12, as well as eCCH12, eCCH13, eCHH14 and eCCE15 in Localized VRB 3, having the same arrangement as eCCEs in the localized VRBs of FIG. 12.

There can be other embodiments to achieve uniform channel estimation performance for ePDCCHs such as: the REGs of an eCCE are mapped in the frequency direction and then in the time direction in a VRB with a predefined time offset (=$N_{eCCEperVRB}$) in OFDM symbols such that eCCHs within a VRB are interlaced in the time domain; one REG of an eCCH is mapped once every other $N_{eCCEperVRB}$ REs in the frequency direction and then in the time direction; and one REG of an eCCH is mapped once every other N eCCEper-VRB REs in the time direction and then in the frequency direction.

MU-MIMO of Localized ePDCCHs

Multi-User MIMO (MU-MIMO) of localized ePDCCHs should enable multiple ePDCCHs to share the same set of resources in their transmissions. Different signatures of DMRS are needed for this operation because if the same DMRS is used then a UE cannot correctly estimate its channel response due to the co-channel interference in channel estimate. There are two ways to provide different signatures of DMRS for MU-MIMO.

Firstly, orthogonal DMRS assisted MU-MIMO: orthogonal DMRS are assigned to different ePDCCHs for MU-MIMO. With this approach, the UE can estimate its DL channel response without co-channel interference. For example, DMRS antenna ports 7 and 8, which are orthogonal to each other owing to CDM using the Walsh code, are assigned to two different ePDCCHs transmitted to different UEs.

Secondly, non-orthogonal DMRS assisted MU-MIMO: non-orthogonal DMRS are generated by applying different scrambling sequence while using the same frequency-time resources and the same Walsh code. Non-orthogonal DMRS assisted MU-MIMO has been supported for PDSCH from LTE Rel-9. A scrambling sequence identification (SCID) is used in generating the DMRS scrambling sequence. Since DMRSs generated by different SCIDs are not orthogonal to each other, co-channel interference in channel estimation is unavoidable. However, in MU-MIMO transmissions, the base station is supposed to apply appropriate precoders to both DMRS and ePDCCH to reduce the co-channel interference, so higher spatial reuse is expected with non-orthogonal DMRS assisted MU-MIMO even though using orthogonal DMRS will always provide better or at least equal channel estimation performance. For example, DMRS antenna ports 7 and 7', which are not orthogonal to each other but share the same DMRS REs reserved for DMRS antenna port 7, are assigned to two different ePDCCHs transmitted to different UEs.

The SCID for MU-MIMO of PDSCH was signaled by PDCCH. However, this cannot apply for ePDCCH since ePDCCH is the physical layer control channel. To address this issue, a higher signaling can be used for the signaling of SCID. Alternatively, the SCID for MU-MIMO of PDSCH can be tied with the ePDCCH search space design in order not to introduce additional signaling overhead.

Mapping Between DMRS Antenna Port and ePDCCH

As discussed above, for a UE to demodulate and decode its ePDCCH, a DMRS antenna port should be assigned to the ePDCCH. To define how to map between DMRS antenna port and ePDCCH, the present disclosure presents embodiments for the ePDCCH search space to indicate the eCCHs occupied by an ePDCCH candidate and the associated DMRS antenna port simultaneously.

In one embodiment according to the present disclosure, the ePDCCH search space indicates the ePDCCH candidates, and the mapping between DMRS antenna port and ePDCCH is dependent on the UE identity, the aggregation level and the leading eCCE's index of the ePDCCH. This embodiment enables the MU-MIMO transmissions using orthogonal DMRS.

For eCCE aggregation levels $L \in \{1, 2, 4, 8\}$, the eCCEs corresponding to ePDCCH candidate m are given by, e.g., Equation (1) above, with $N_{eCCE,k}$ in place of $N_{CCE,k}$: CCEs for ePDCCH candidate m:

$$L \cdot \{(Y_k + m') \bmod \lfloor N_{eCCE,k}/L \rfloor\} + i \qquad (4)$$

where $N_{eCCE,k}$ is the total number of eCCEs for the localized ePDCCHs in subframe k and i=0, ..., L−1. If ePCFICH is not introduced for dynamic configuration of the localized control region size, $N_{eCCE,k}$ is determined by higher layer signaling and does not vary depending on subframe index k. For the UE-SS, for the serving cell on which ePDCCH is monitored, if the monitoring UE is configured with a carrier indicator field then $m'=m+M^{(L)} \cdot n_{CI}$, where $n_{CI}$ is the carrier indicator field value. Otherwise, if the monitoring UE is not configured with a carrier indicator field then m'=m, where m=0, ..., $M^{(L)}-1$, and $M^{(L)}$ is the number of ePDCCH candidates to monitor in the search space.

In searching eCCEs for ePDCCH candidate m, equation (4) can be rewritten as follows:

$$n_{eCCE,leading} + i \qquad (5)$$

where $n_{eCCE,leading}$ is the leading eCCE, $$L \cdot \left\{(Y_k + m') \bmod \left\lfloor \frac{N_{eCCE,k}}{L} \right\rfloor \right\}.$$

In other words, the leading eCCE has the lowest index among eCCEs, and the eCCEs for ePDCCH candidate m consist of the leading CCE and the consecutive following eCCEs depending upon aggregation level L.

In this embodiment, the DMRS antenna port of ePDCCH candidate m is determined by, for example:

$$p = 7 + \left[L \cdot \left\{(Y_k + m') \bmod \left\lfloor \frac{N_{eCCE,k}}{L} \right\rfloor \right\}\right] \bmod N_{eCCEperVRB} + \Delta_{DMRS} \qquad (6)$$

where $\Delta_{DMRS}$ indicates the DMRS antenna port offset from the DMRS antenna port determined by the leading eCCE's index and is given as a function of at least the UE identity and the aggregation level, i.e., different UEs will have different DMRS antenna port offsets. In Equation (6), '7' is added for setting a base number for the DMRS antenna port in the exemplary embodiment; however, that constant can be configured to any desired number in other embodiments.

Equation (6) can be rewritten using $n_{eCCE,leading}$ as follows:

$$p = 7 + n_{eCCE,leading} \bmod N_{eCCEperVRB} + \Delta_{DMRS} \quad (7)$$

In this embodiment, an example of the offset function is $$\Delta_{DMRS}(UE\_ID, L) = \{UE\_ID \bmod L\} \bmod N_{DMRS,L} \quad (8)$$

or equivalently $\Delta_{DMRS}(UE\_ID, L) = \{UE\_ID \bmod L\} \bmod \{\min(L, N_{DMRS,L})\}$ if $L = \{1, 2, 4, 8\}$ and $N_{DMRS,L} = \{2, 4\}$, where $N_{DMRS,L}$ is the number of DMRS antenna ports available for ePDCCHs depending on the aggregation level and given as fixed values or set up by a higher layer signaling. Note that $N_{DMRS,L} \le N_{eCCEperVRB}$ since the number of DMRS antenna ports required for this operation does not need to exceed the number of eCCEs per VRB and, if the MU-MIMO order does not need to be limited for $L > 1$, then typically $N_{DMRS,L} = N_{DMRS} = N_{eCCEperVRB}$ is sufficient regardless of L, and no higher layer signaling is needed in this case. If the offset function of Equation (8) is applied, then Equations (6) and (7) will become:

$$p = 7 + n_{eCCE,leading} \bmod N_{eCCEperVRB} + \{UE\_ID \bmod L\} \bmod N_{DMRS,L} \quad (9)$$

Equation (9) means that the DMRS antenna port is decided by UE_ID, the aggregation level, and the leading eCCE's index of the ePDCCH. For example, assuming that $N_{eCCEperVRB} = 4$ and $N_{DMRS,1} = N_{DMRS,2} = N_{DMRS,4} = N_{DMRS,8} = 4$, for $L = 1$, DMRS antenna port 7, 8, 9 or 10 is assigned if the eCCE index is 4n, 4n+1, 4n+2, or 4n+3, respectively. Also, for $L = 2$, DMRS antenna port 7 or 8 is assigned if the leading eCCE's index is 4n, and UE_ID=2n' or 2n'+1, respectively; and DMRS antenna port 9 or 10 is assigned if the leading eCCE's index is 4n+2, and UE_ID=2n' or 2n'+1, respectively. Further, for $L = 4$ or $L = 8$, DMRS antenna port 7, 8, 9 or 10 is assigned if UE_ID=4n', 4n'+1, 4n'+2 or 4n'+3, respectively. Here, n and n' are integer numbers.

Another example of the offset function is:

$$\Delta_{DMRS}(UE\_ID, L) = \{Y_k \bmod L\} \bmod N_{DMRS,L} \quad (10)$$

or equivalently $\Delta_{DMRS}(UE\_ID, L) = \{Y_k \bmod L\} \bmod \{\min(N_{DMRS,L})\}$ if $L = \{1, 2, 4, 8\}$ and $N_{DMRS,L} = \{2, 4\}$, which means $\Delta_{DMRS}$ is derived from the UE-specific time-varying random variable, $Y_k$.

Further, another example of the offset function is $$\Delta_{DMRS}(UE\_ID, L) = \{(UE\_ID + k) \bmod L\} \bmod N_{DMRS,L} \quad (11)$$

which means $\Delta_{DMRS}$ is directly derived from UE_ID and the subframe index, k.

In this embodiment, MU-MIMO of ePDCCHs is supported by using non-orthogonal DMRS because ePDCCHs occupying the same set of eCCEs will use the same DMRS antenna port. The SCID of the DMRS is configured by a UE-specific higher layer signaling or determined by a parameter, e.g., the transmission point identification (TPID) in the distributed antenna systems.

In another embodiment according to the present disclosure, the ePDCCH search space indicates the ePDCCH candidates, the mapping between DMRS antenna port and ePDCCH is predefined, and the SCID of the DMRS is configured by a higher layer.

As noted above, for eCCE aggregation levels $L \in \{1, 2, 4, 8\}$, the eCCEs corresponding to ePDCCH candidate m are given by, e.g., Equation (1), with $N_{eCCE,k}$ in place of $N_{CCE,k}$:

$$L \cdot \{(Y_k + m') \bmod \lfloor N_{eCCE,k}/L \rfloor\} + i \quad (12)$$

where $N_{eCCE,k}$ is the total number of eCCEs for the localized ePDCCHs in subframe k and $i = 0, \ldots, L-1$. If ePCFICH is not introduced for dynamic configuration of the localized control region size, $N_{eCCE,k}$ is determined by higher layer signaling and does not vary depending on subframe index k. For the UE-SS, for the serving cell on which the ePDCCH is monitored, if the monitoring UE is configured with a carrier indicator field, then $m' = m + M^{(L)} \cdot n_{CI}$, where $n_{CI}$ is the carrier indicator field value. Otherwise, if the monitoring UE is not configured with a carrier indicator field, then $m' = m$, where $m = 0, \ldots, M^{(L)} - 1$, and $M^{(L)}$ is the number of ePDCCH candidates to monitor in the search space.

The DMRS antenna port of ePDCCH candidate m is determined by, for example:

$$p = 7 + [L \cdot \{(Y_k + m') \bmod \lfloor N_{eCCE,k}/L \rfloor\}] \bmod N_{eCCEperVRB} \quad (13)$$

which means that the DMRS antenna port is decided by the leading eCCE's index of the ePDCCH, i.e. assuming $N_{eCCEperVRB} = 4$, DMRS antenna port 7, 8, 9 or 10 is assigned if the leading eCCE's index is 4n, 4n+1, 4n+2 or 4n+3, respectively. Here, n is an integer number.

In this embodiment, MU-MIMO of ePDCCHs is supported by using non-orthogonal DMRS because ePDCCHs occupying the same set of eCCEs will use the same DMRS antenna port. The SCID of the DMRS is configured by a UE-specific higher layer signaling or determined by a parameter, e.g., the transmission point identification (TPID) in the distributed antenna systems.

In another embodiment according to the present disclosure, the ePDCCH search space indicates the ePDCCH candidates and the SCID of the DMRS of an ePDCCH candidate, the mapping between DMRS antenna port and ePDCCH is predefined.

The eCCEs corresponding to an ePDCCH candidate and its associated DMRS antenna port are determined by Equation (12). The SCID of the DMRS is defined as a function of $Y_k$ and a function of the ePDCCH candidate index m, for example:

$$SCID = (Y_k + m') \bmod N_{SCID} \quad (14)$$

where $N_{SCID}$ denotes the number of total SCIDs.

Another embodiment of deciding SCID is that the SCID of the DMRS is defined as a function of $Y_k$ and not a function of the ePDCCH candidate index m, for example:

$$SCID = Y_k \bmod N_{SCID} \quad (15)$$

Another embodiment of deciding SCID is that the SCID of the DMRS is defined as a function of $Y_{-1} = UE\_ID \ne 0$, for example:

$$SCID = UE\_ID \bmod N_{SCID} \quad (16)$$

In this embodiment, a higher layer signaling does not need to be introduced for SCID configuration because the SCID is implicitly determined by the search space.

In another embodiment according to the present disclosure, the ePDCCH search space indicates the ePDCCH candidates and the associated DMRS antenna port while the SCID of the DMRS is configured by a higher layer.

For eCCE aggregation levels $L \in \{1, 2, 4, 8\}$, the eCCEs corresponding to ePDCCH candidate m may be given by, for example:

$$L \cdot \lfloor X_{k,m}/L \rfloor + 1 \quad (17)$$

where $$X_{k,m} = (Y_k + m') \bmod \left( L \cdot \left\lfloor \frac{N_{eCCE,k}}{L} \right\rfloor \right),$$

$N_{eCCE,k}$ is the total number of eCCEs for the localized ePDCCHs in subframe k and $i = 0, \ldots, L-1$. If ePCFICH is not introduced for dynamic configuration of the localized control region size, $N_{eCCE,k}$ is determined by higher layer signaling and does not vary depending on subframe index k. For the UE-SS, for the serving cell on which the ePDCCH is monitored, if the monitoring UE is configured with a carrier indicator field, then $m'=m+M^{(L)} \cdot n_{CI}$, where $n_{CI}$ is the carrier indicator field value. Otherwise, if the monitoring UE is not configured with a carrier indicator field, then m'=m, where m=0, $M^{(L)}-1$, and $M^{(L)}$ is the number of ePDCCH candidates to monitor in the search space.

The DMRS antenna port of ePDCCH candidate m is determined by, for example:

$$p=7+(X_{k,m}-N_{eCCEperVRB}\lfloor X_{k,m}/N_{eCCEperVRB}\rfloor) \bmod N_{DMRS,L} \quad (18)$$

where $N_{DMRS,L}$ is the number of DMRS antenna ports available for ePDCCHs and given as fixed values or set up by a higher layer signaling. In this embodiment, it is assumed that $N_{DMRS,L}$ depends on the aggregation level. As another embodiment, it can be assumed that $N_{DMRS,L}=N_{DMRS}$ for all aggregation levels. $N_{DMRS,L}$ can be configured by higher layer signal or given as fixed values, e.g., $N_{DMRS,1}=N_{DMRS,2}=4$ and $N_{DMRS,4}=N_{DMRS,8}=2$.

Figure 15:
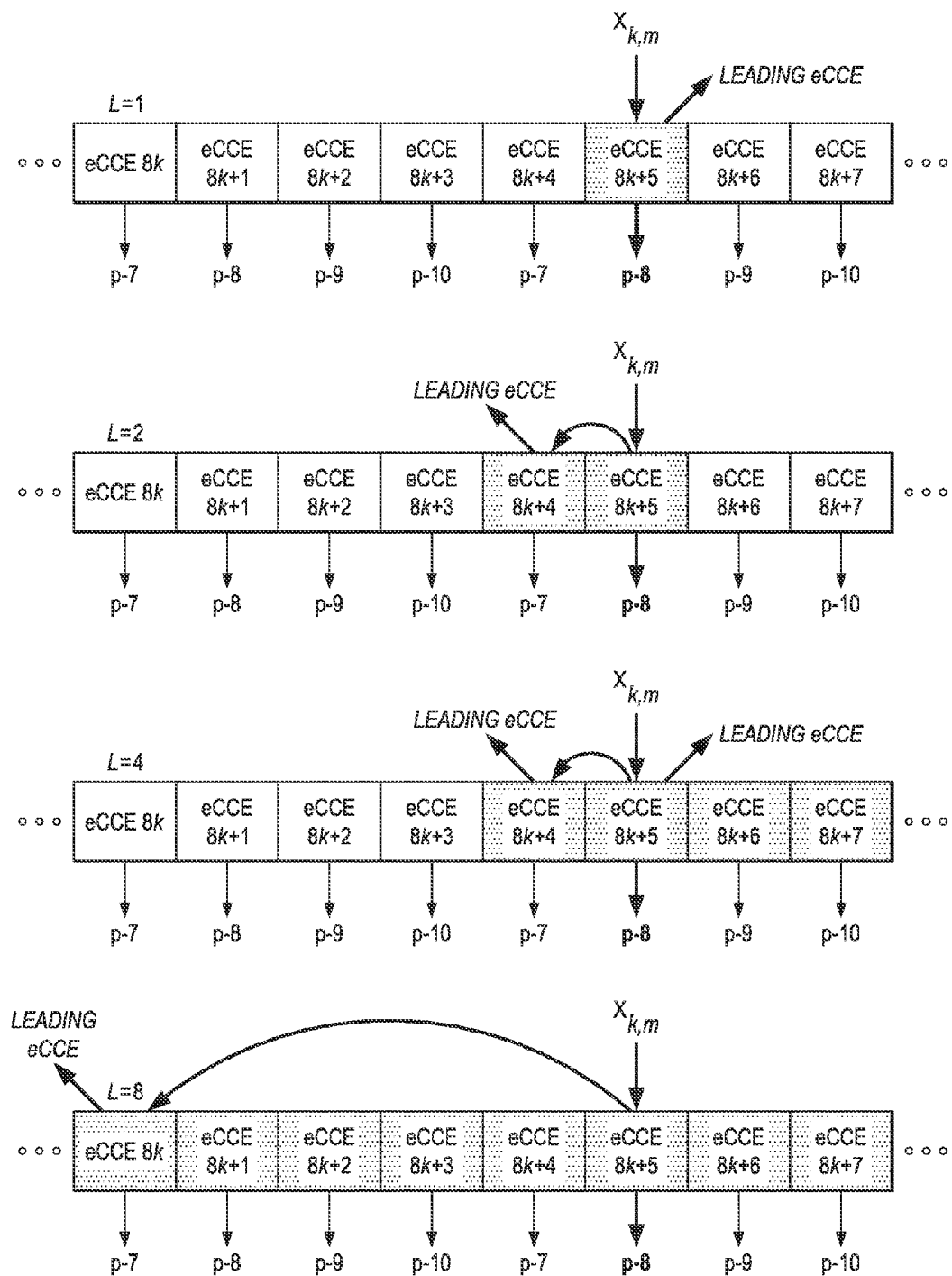
FIG. 15 illustrates the decision of the leading eCCE and the DMRS port according to certain embodiments of the present disclosure.

FIG. 15 illustrates the decision of the leading eCCE and the DMRS antenna port where $N_{DMRS}=4$ according to one embodiment of the present disclosure. In this embodiment, a random variable $X_{k,m}$ points to an eCCE. Each eCCE is mapped to a DMRS antenna port such as: eCCE 4n is mapped to DMRS antenna port 7; eCCE 4n+1 is mapped to DMRS antenna port 8; eCCE 4n+2 is mapped to DMRS antenna port 9; eCCE 4n+3 is mapped to DMRS antenna port 10.

Referring to FIG. 15, $X_{k,m}$ pointed eCCE 8k+5. When the LTE Rel-8 rule of making a PDCCH candidate is applied to this example, it leads to the following ePDCCH construction method for each aggregation level: in case of L=1, eCCE 8k+5 will construct an ePDCCH candidate with the leading eCCE 8k+5; in case of L=2, eCCEs 8k+4 and 8k+5 will construct an ePDCCH candidate with the leading eCCE 8k+4; in case of L=4, eCCEs 8k+4 to 8k+7 will construct an ePDCCH candidate with the leading eCCE 8k+4; and in case of L=8, eCCEs 8k to 8k+7 will construct an ePDCCH candidate with the leading eCCE 8k.

The DMRS antenna port can be decided by the leading eCCE derived from Equation (12). On the other hand, the DMRS antenna port is decided by $X_{k,m}$ in this embodiment, which allows multiple UEs to have a given ePDCCH candidate with orthogonal DMRS antenna ports and this operation implicitly supports the orthogonal DMRS assisted MU-MIMO of ePDCCHs.

For example, assuming a random variable $X_{k,m}$ for a UE (UE-a) points eCCE 8k+5 and that for another UE (UE-b) points eCCE 8k+4. In case of L=2, both UEs will have the same ePDCCH candidate which consists of eCCEs 8k+4 and 8k+5. According to Equations (12) and (13), both UEs that have the ePDCCH candidate are supposed to use the same DMRS antenna port 7 as shown in FIGS. 16A and 16B. To support MU-MIMO, both UEs should be assigned different SCID. This is the operation of non-orthogonal DMRS assisted MU-MIMO. On the other hand, UE-a and UE-b will be assigned DMRS antenna ports 8 and 7, respectively, as shown in FIG. 17, which allows the orthogonal DMRS assisted MU-MIMO.

In this embodiment, the non-orthogonal DMRS assisted MU-MIMO is also supportable by either configuring the SCID of the DMRS either via a UE-specific higher layer signaling or determining it by a parameter, e.g. the transmission point identification (TPID) in the distributed antenna systems. Therefore, this embodiment supports both orthogonal DMRS assisted MU-MIMO and non-orthogonal DMRS assisted MU-MIMO and presents more flexibility in ePDCCH scheduling to the base station.

In another embodiment according to the present disclosure, the ePDCCH search space indicates the ePDCCH candidates, the associated DMRS antenna port, and the SCID of the DMRS of an ePDCCH candidate as well.

The eCCEs corresponding to an ePDCCH candidate and its associated DMRS antenna port are determined by Equations 18 and 19. The SCID of the DMRS is defined as a function of $Y_k$ and a function of the ePDCCH candidate index m, e.g., Equation (15). Another example of deciding SCID is that the SCID of the DMRS is defined as a function of $Y_k$ and not a function of the ePDCCH candidate index m, e.g., Equation (16). Another example of deciding SCID is that the SCID of the DMRS is defined as a function of $Y_{-1}=UE\_ID\neq0$, e.g., Equation (15). In this embodiment, a higher layer signaling does not need to be introduced for SCID configuration because the SCID is implicitly determined by the search space.

In another embodiment according to the present disclosure, the ePDCCH search space indicates the ePDCCH candidates and the SCID of the DMRS, and the mapping between DMRS antenna port and ePDCCH is dependent on UE_ID, the aggregation level, and the leading eCCE's index of the ePDCCH.

The eCCEs corresponding to an ePDCCH candidate and its associated DMRS antenna port are determined by Equation (4). The SCID of the DMRS is defined as a function of $Y_k$ and a function of the ePDCCH candidate index m, e.g., Equation (14). Another example of deciding SCID is that the SCID of the DMRS is defined as a function of $Y_k$ and not a function of the ePDCCH candidate index m, e.g., Equation (15). Another example of deciding SCID is that the SCID of the DMRS is defined as a function of $Y_{-1}=UE\_ID\neq0$, e.g., Equation (16).

In this embodiment, a higher layer signaling does not need to be introduced for SCID configuration because the SCID is implicitly determined by the search space.

In one embodiment according to the present disclosure, the ePDCCH search space indicates that the ePDCCH candidates, the mapping between DMRS antenna port and ePDCCH is dependent on the UE_ID, the aggregation level, the ePDCCH candidate index, and the leading eCCE's index of the ePDCCH, where the SCID of the DMRS is configured by a higher layer.

For eCCE aggregation levels L$\in\{1, 2, 4, 8\}$, the eCCEs corresponding to ePDCCH candidate m are given by, for example:

$$L \cdot \{(Y_k+m') \bmod \lfloor N_{eCCE,k}/L \rfloor\} \quad (19)$$

where $N_{eCCE,k}$ is the total number of eCCEs for the localized ePDCCHs in subframe k and i=0, ..., L−1. If ePCFICH is not introduced for dynamic configuration of the localized control region size, $N_{eCCE,k}$ is determined by higher layer signaling and does not vary depending on subframe index k. For the UE-SS, for the serving cell on which ePDCCH is monitored, if the monitoring UE is configured with a carrier indicator field then $m'=m+M^{(L)} \cdot n_{CI}$, where $n_{CI}$ is the carrier indicator field value. Otherwise, if the monitoring UE is not configured with carrier indicator field then m'=m, where m=0, ..., $M^{(L)}-1$, and $M^{(L)}$ is the number of ePDCCH candidates to monitor in the search space.

The DMRS antenna port of ePDCCH candidate m is determined by, for example:

$$p=7+[L \cdot \{(Y_k+m') \bmod \lfloor N_{eCCE,k}/L \rfloor\}] \bmod N_{eCCEperVRB}+\Delta_{DMRS}(m,L) \quad (20)$$

where $\Delta_{DMRS}(m,L)$ indicates the DMRS antenna port offset from the DMRS antenna port determined by the leading eCCE's index and is given as a function of the ePDCCH candidate index m and aggregation level L. This property allows a UE to have different DMRS antenna ports for different ePDCCH candidates and therefore, if two UEs are assigned the same ePDCCH candidate but different DMRS antenna ports, then their ePDCCHs can be multiplexed using the same ePDCCH candidate.

An example of the offset function is $\Delta_{DMRS}(m,L)=\{m \bmod L\} \bmod N_{DMRS,L}$. $N_{DMRS,L}$ is the number of DMRS antenna ports available for ePDCCHs depending on the aggregation level and given as fixed values or set up by a higher layer signaling. If the example is applied, then Equation (15) will become:

$$p=7+[L \cdot \{(Y_k+m') \bmod \lfloor N_{eCCE,k}/L \rfloor\}] \bmod N_{eCCEperVRB}+\{m \bmod L\} \bmod N_{DMRS,L} \quad (21)$$

which means that the DMRS antenna port is decided by UE_ID, the aggregation level, the ePDCCH candidate index, and the leading eCCE's index of the ePDCCH, i.e., assuming $N_{eCCEperVRB}=4$ and $N_{DMRS,1}=N_{DMRS,2}=N_{DMRS,4}=N_{DMRS,8}=4$.

In this embodiment, for L=1, DMRS antenna port 7, 8, 9, or 10 is assigned if the eCCE index is 4n, 4n+1, 4n+2, or 4n+3, respectively. For L=2, DMRS antenna port 7 is assigned if the leading eCCE's index is 4n and m=2n'; DMRS antenna port 8 is assigned if the leading eCCE's index is 4n and m=2n'+1; DMRS antenna port 9 is assigned if the leading eCCE's index is 4n+2 and m=2n'; and DMRS antenna port 10 is assigned if the leading eCCE's index is 4n+2 and m=2n'+1. For L=4 or L=8, DMRS antenna port 7, 8, 9 or 10 is assigned if m=4n', 4n'+1, 4n'+2 or 4n'+3. Note that n and n' are integer numbers. DMRS antenna ports 9 and 10 are not actually assigned for L=4 or L=8 if we maintain $M^{(4)}=M^{(8)}=2$. Therefore, there is no need to have $N_{DMRS,4}=N_{DMRS,8}=4$, i.e., $N_{DMRS,4}=N_{DMRS,8}=2$ is enough. Another example of the offset function is $\Delta_{DMRS}(m,L)=\{m' \bmod L\} \bmod N_{DMRS,L}$.

In this embodiment, MU-MIMO of ePDCCHs is supported by using non-orthogonal DMRS because the ePDCCHs occupying the same set of eCCEs will use the same DMRS antenna port. The SCID of the DMRS is either configured by a UE-specific higher layer signaling or determined by a parameter, e.g., the transmission point identification (TPID) in the distributed antenna systems.

In another embodiment according to the present disclosure, the ePDCCH search space indicates the ePDCCH candidates and the SCID of the DMRS, and the mapping between DMRS antenna port and ePDCCH is dependent on UE_ID, the aggregation level, and the leading eCCE's index of the ePDCCH.

The eCCEs corresponding to an ePDCCH candidate and its associated DMRS antenna port are determined by Equations (19) and (20). The SCID of the DMRS is defined as a function of $Y_k$ and a function of the ePDCCH candidate index m, e.g., Equation (14). Another example of deciding SCID is that the SCID of the DMRS is defined as a function of $Y_k$ and not a function of the ePDCCH candidate index m, e.g., Equation (15). Another example of deciding SCID is that the SCID of the DMRS is defined as a function of $Y_{-1}=UE\_ID \neq 0$, e.g., Equation (16).

In this embodiment, a higher layer signaling does not need to be introduced for SCID configuration because the SCID is implicitly determined by the search space.

In one embodiment according to the present disclosure, the ePDCCH search space indicates the ePDCCH candidates, the mapping between DMRS antenna port and ePDCCH is dependent on the ePDCCH candidate index and the aggregation level, and the SCID of the DMRS is configured by a higher layer.

For eCCE aggregation levels $L \in \{1, 2, 4, 8\}$, the eCCEs corresponding to ePDCCH candidate m are given by, e.g. CCEs for ePDCCH candidate m:

$$L \cdot \{(Y_k+m') \bmod \lfloor N_{eCCE,k}/L \rfloor\}+i \quad (22)$$

where $N_{eCCE,k}$ is the total number of eCCEs for the localized ePDCCHs in subframe k and 0, ..., L−1. If ePCFICH is not introduced for dynamic configuration of the localized control region size $N_{eCCE,k}$ is determined by higher layer signaling and does not vary depending on subframe index k. For the UE-SS, for the serving cell on which the ePDCCH is monitored, if the monitoring UE is configured with a carrier indicator field, then m'=m+$M^{(L)} \cdot n_{CI}$, where $n_{CI}$ is the carrier indicator field value. Otherwise, if the monitoring UE is not configured with a carrier indicator field, then m'=m, where m=0, ..., $M^{(L)}$−1, and $M^{(L)}$ is the number of ePDCCH candidates to monitor in the search space.

The DMRS antenna port of ePDCCH candidate m is determined by, for example:

$$p=7+\Delta_{DMRS}(m,L) \quad (23)$$

where $\Delta_{DMRS}(m,L)$ indicates the DMRS antenna port offset from DMRS antenna port 7 and is given as a function of the ePDCCH candidate index m and the aggregation level L. This property allows a UE to have different DMRS antenna ports for different ePDCCH candidates and therefore, if two UEs are assigned the same ePDCCH candidate but different DMRS antenna ports, then their ePDCCHs can be multiplexed using the same ePDCCH candidate.

An example of the offset function is $\Delta_{DMRS}(m,L)=m \bmod N_{DMRS,L}$. $N_{DMRS,L}$ is the number of DMRS antenna ports available for ePDCCHs depending on the aggregation level and given as fixed values or set up by a higher layer signaling. If the example is applied, then Equation 23 will become $$p=7+m \bmod N_{DMRS,L} \quad (24)$$

which means that the DMRS antenna port is decided by UE_ID, the aggregation level, the ePDCCH candidate index, and the leading eCCE's index of the ePDCCH, i.e. assuming $N_{eCCEperVRB}=4$ and $N_{DMRS,1}=N_{DMRS,2}=N_{DMRS,4}=N_{DMRS,8}=4$, DMRS antenna port 7, 8, 9 or 10 is assigned if m=4n', 4n'+1, 4n'+2 or 4n'+3. Note that n' is an integer number. In this exemplary offset function, DMRS antenna ports 9 and 10 are not actually assigned for L=4 or L=8 if we maintain $M^{(4)}=M^{(8)}=2$. Therefore, there is no need to have $N_{DMRS,4}=N_{DMRS,8}=4$, i.e. $N_{DMRS,4}=N_{DMRS,8}=2$ is sufficient. Another example of the offset function is $\Delta_{DMRS}(m,L)=\{m' \bmod L\} \bmod N_{DMRS,L}$.

In this embodiment, MU-MIMO of ePDCCHs is supported by using non-orthogonal DMRS because ePDCCHs occupying a same set of eCCEs will use the same DMRS antenna port. The SCID of the DMRS is configured by a UE-specific higher layer signaling or determined by a parameter, e.g., the transmission point identification (TPID) in the distributed antenna systems.

In another embodiment according to the present disclosure, the ePDCCH search space indicates the ePDCCH candidates and the SCID of the DMRS, the mapping between DMRS antenna port and ePDCCH is dependent on the ePDCCH candidate index and the aggregation level. The eCCEs corresponding to an ePDCCH candidate and its associated DMRS antenna port are determined by Equations (21) and (22). The SCID of the DMRS is defined as a function of $Y_k$ and a function of the ePDCCH candidate index m, e.g., Equation (14). Another example of deciding SCID is that the SCID of the DMRS is defined as a function of $Y_k$ and not a function of the ePDCCH candidate index m, e.g., Equation (15). Another example of deciding SCID is that the SCID of the DMRS is defined as a function of $Y_{-1}$=UE_ID≠0, e.g., Equation (16).

In this embodiment, a higher layer signaling does not need to be introduced for SCID configuration because the SCID is implicitly determined by the search space.

In one embodiment according to the present disclosure, the ePDCCH search space indicates the ePDCCH candidates and the associated DMRS antenna port while the SCID of the DMRS is configured by a higher layer.

For eCCE aggregation levels L∈{1, 2, 4, 8}, the eCCEs corresponding to ePDCCH candidate m are given by, for example:

$$L \cdot \{(Y_k + m') \bmod \lfloor N_{eCCE,k}/L \rfloor\} + i \quad (25)$$

where $N_{eCCE,k}$ is the total number of eCCEs for the localized ePDCCHs in subframe k and i=0, ..., L−1. If ePCFICH is not introduced for dynamic configuration of the localized control region size, $N_{eCCE,k}$ is determined by higher layer signaling and does not vary depending on subframe index k. For the UE-SS, for the serving cell on which the ePDCCH is monitored, if the monitoring UE is configured with a carrier indicator field, then m'=m+$M^{(L)} \cdot n_{CI}$, where $n_{CI}$ is the carrier indicator field value. Otherwise, if the monitoring UE is not configured with a carrier indicator field, then m'=m, where m=0, ..., $M^{(L)}$−1, and $M^{(L)}$ is the number of ePDCCH candidates to monitor in the search space.

The DMRS antenna port of ePDCCH candidate m is determined by, for example:

$$p = 7 + [L \cdot \{(Y_k + m') \bmod \lfloor N_{eCCE,k}/L \rfloor\}] \bmod N_{eCCEperVRB} + Y_{-1} \bmod x_L \quad (26)$$

where $Y_{-1}$=UE_ID≠0 and $x_L$ is a parameter depending on the aggregation level L, e.g. $x_1$=1, $x_2$=$x_4$=$x_8$=2 or $x_1$=1, $x_2$=2, $x_4$=$x_8$=4.

$[L \cdot \{(Y_k + m') \bmod \lfloor N_{eCCE,k}/L \rfloor\}] \bmod N_{eCCEperVRB}$ indicates the relative index of the leading eCCE within the VRB. 7+[L·Yk+m' mod NeCCE,kL mod NeCCEperVRB is identical to the DMRS antenna port index of Equation (13). In Equation (26), the additional UE_ID dependent offset of $Y_{-1}$ mod $x_1$, is applied, which allows the different UEs having the same ePDCCH candidate in terms of eCCE aggregation to have different DMRS antenna ports and implicitly support orthogonal MU-MIMO of ePDCCHs.

For example, let's assume that the UE_IDs of UE-a and UE-b are 10 and 11 respectively, and both UEs have the same set of eCCEs for an ePDCCH candidate, {eCCE8, eCCE9} for aggregation level 2. Then, the leading eCCE of the ePDCCH candidate for both UEs is eCCE8. Therefore, in this example, UE-a and UE-b will be assigned DMRS antenna ports 7 and 8, respectively. It allows the orthogonal DMRS assisted MU-MIMO.

In this embodiment, the non-orthogonal DMRS assisted MU-MIMO is also supportable by either configuring the SCID of the DMRS either via a UE-specific higher layer signaling or determining it by a parameter, e.g., the transmission point identification (TPID) in the distributed antenna systems.

Therefore, this embodiment supports both orthogonal DMRS assisted MU-MIMO and non-orthogonal DMRS assisted MU-MIMO and presents more flexibility in ePDCCH scheduling to the base station.

In another embodiment, the ePDCCH search space indicates the ePDCCH candidates, the associated DMRS antenna port, and the SCID of the DMRS of an ePDCCH candidate as well.

The eCCEs corresponding to an ePDCCH candidate and its associated DMRS antenna port are determined by Equation (26). The SCID of the DMRS is defined as a function of $Y_k$ and a function of the ePDCCH candidate index m, e.g., Equation (14). Another example of deciding SCID is that the SCID of the DMRS is defined as a function of $Y_k$ and not a function of the ePDCCH candidate index m, e.g., Equation (15). Another example of deciding SCID is that the SCID of the DMRS is defined as a function of $Y_{-1}$=UE_ID≠0, e.g., Equation (16).

In this embodiment, a higher layer signaling does not need to be introduced for SCID configuration because the SCID is implicitly determined by the search space.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
a controller configured to determine a DeModulation Reference Signal (DMRS) antenna port for an extended Physical Downlink Control CHannel (ePDCCH) transmission based on at least a first parameter computed using an index for a leading extended Control Channel Element (eCCE) within the ePDCCH and a second parameter computed using an identifier for a user equipment (UE) to receive the ePDCCH transmission and the leading eCCE index; and
a transmitter configured to transmit symbols via the determined DMRS antenna port to the UE.

2. The base station according to claim 1, wherein the leading eCCE within the ePDCCH is determined by:

$$n_{eCCE,leading} = L \cdot \{(Y_k + m') \bmod \lfloor N_{eCCE,k}/L \rfloor\},$$

where $n_{eCCE,leading}$ is the leading eCCE index, L is an eCCE aggregation level, $Y_k$ is either zero or a non-zero value based on the UE identifier, m' has a value depending on whether the UE is configured with a carrier indicator field, and $N_{eCCE,k}$ is a total number of eCCEs in subframe k.

3. The base station according to claim 2, wherein the antenna port is determined by:

$$p = 7 + n_{eCCE,leading} \bmod N_{eCCEperVRB} + \Delta_{DMRS}$$

where p is an identifier of the DMRS antenna port, $N_{eCCEperVRB}$ is a number of eCCEs assigned to each virtual resource block (VRB) within the ePDCCH, and $\Delta_{DMRS}$ is an antenna port offset determined by the leading eCCE's index and given as a function of the UE identifier.

4. The base station according to claim 3, wherein the antenna port offset is determined by:

$$\Delta_{DMRS}(UE\_ID, L) = \{UE\_ID \bmod L\} \bmod N_{DMRS}$$

where $N_{DMRS,L}$ is a number of antenna ports available for ePDCCH transmissions depending on the aggregation level.

5. The base station according to claim 1, wherein the controller is configured to assign the UE to the determined DMRS antenna port for the ePDCCH transmission.

6. The base station according to claim 1, wherein the UE employs the DMRS for demodulation rather than a Cell-specific Reference Signal (CRS).

7. The base station according to claim 6, wherein the DMRS is a UE-specific DMRS.

8. The base station according to claim 1, wherein the symbols are transmitted within a Physical Downlink Shared CHannel (PDSCH) region of a downlink (DL) subframe.

9. The base station according to claim 1, wherein the controller is configured to determine the antenna port for the ePDCCH transmission based on whether the ePDCCH transmission is localized or distributed.

10. The base station according to claim 1, wherein the controller is configured to map the symbols to resource elements (REs) that are associated with the determined antenna port, that are part of extended RE Groups (eREGs) assigned for ePDCCH transmission, and that exclude REs occupied by Physical Broadcast CHannel (PBCH) signals, reference signals for the UE, and synchronization signals.

11. The base station according to claim 1, wherein the determined antenna port is one of four predetermined antenna ports.

12. The base station according to claim 1, wherein the determined antenna port is one of antenna ports 7, 8, 9 and 10.

13. A method, comprising:
    determining a DeModulation Reference Signal (DMRS) antenna port for an extended Physical Downlink Control CHannel (ePDCCH) transmission based on at least a first parameter computed using an index for a leading extended Control Channel Element (eCCE) within the ePDCCH and a second parameter computed using an identifier for a user equipment (UE) to receive the ePDCCH transmission and the leading eCCE index; and
    transmitting symbols via the determined DMRS antenna port to the UE.

14. The method according to claim 13, wherein the leading eCCE within the ePDCCH is determined by:

$$n_{eCCE,leading} = L \cdot \{(Y_k + m') \bmod \lfloor N_{eCCE,k}/L \rfloor\},$$

where $n_{eCCE,leading}$ is the leading eCCE index, L is an eCCE aggregation level, $Y_k$ is either zero or a non-zero value based on the UE identifier, m' has a value depending on whether the UE is configured with a carrier indicator field, and $N_{eCCE,k}$ is a total number of eCCEs in subframe k.

15. The method according to claim 14, wherein the antenna port is determined by:

$$p = 7 + n_{eCCE,leading} \bmod N_{eCCEperVRB} + \Delta_{DMRS}$$

where p is an identifier of the DMRS antenna port, $N_{eCCEperVRB}$ is a number of eCCEs assigned to each virtual resource block (VRB) within the ePDCCH, and $\Delta_{DMRS}$ is an antenna port offset determined by the leading eCCE's index and given as a function of the UE identifier.

16. The method according to claim 15, wherein the antenna port offset is determined by:

$$\Delta_{DMRS}(UE\_ID,L) = \{UE\_ID \bmod L\} \bmod N_{DMRS,L}$$

where $N_{DMRS,L}$ is a number of antenna ports available for ePDCCH transmissions depending on the aggregation level.

17. The method according to claim 13, further comprising: assigning the UE to the determined DMRS antenna port for the ePDCCH transmission.

18. The method according to claim 14, wherein the UE employs the DMRS for demodulation rather than a Cell-specific Reference Signal (CRS).

19. The method according to claim 18, wherein the DMRS is a UE-specific DMRS.

20. The method according to claim 13, wherein the symbols are transmitted within a Physical Downlink Shared CHannel (PDSCH) region of a downlink (DL) subframe.

21. The method according to claim 13, wherein the controller is configured to determine the antenna port for the ePDCCH transmission based on whether the ePDCCH transmission is localized or distributed.

22. The method according to claim 13, wherein the controller is configured to map the symbols to resource elements (REs) that are associated with the determined antenna port, that are part of extended RE Groups (eREGs) assigned for ePDCCH transmission, and that exclude REs occupied by Physical Broadcast CHannel (PBCH) signals, reference signals for the UE, and synchronization signals.

23. The method according to claim 13, wherein the determined antenna port is one of four predetermined antenna ports.

24. The method according to claim 13, wherein the determined antenna port is one of antenna ports 7, 8, 9 and 10.

* * * * *